(12) United States Patent
Chao et al.

(10) Patent No.: US 8,747,593 B2
(45) Date of Patent: Jun. 10, 2014

(54) METHODS FOR MANUFACTURING FLUID-FILLED CHAMBERS INCORPORATING SPACER TEXTILE MATERIALS

(75) Inventors: Kirvan L. Chao, Portland, OR (US); Klaas P. Hazenberg, Guangzhou (CN)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/571,749

(22) Filed: Aug. 10, 2012

(65) Prior Publication Data

US 2013/0263391 A1 Oct. 10, 2013

Related U.S. Application Data

(63) Continuation-in-part of application No. 13/443,421, filed on Apr. 10, 2012.

(51) Int. Cl.
*A63B 41/02* (2006.01)
*A43B 13/18* (2006.01)

(52) U.S. Cl.
USPC ............. 156/145; 156/148; 156/176; 66/195; 66/196; 12/146 B

(58) Field of Classification Search
USPC ............... 36/28, 29, 24; 428/86, 223, 188, 428/311.11, 76, 36.1; 442/203, 204, 205, 442/206, 207, 208; 66/147, 195, 196, 192, 66/193; 156/145, 148, 250, 285, 286, 433, 156/434, 441, 292, 308.4, 293; 139/405, 139/408, 410, 411, 412, 413, 414, 415
See application file for complete search history.

(56) References Cited

U.S. PATENT DOCUMENTS

| | | |
|---|---|---|
| 1,088,328 A | 2/1914 | Cucinotta |
| 2,743,510 A | 5/1956 | Mauney et al. |
| 3,015,148 A | 1/1962 | Haddad |
| 3,205,106 A | 9/1965 | Cross |
| 3,253,355 A | 5/1966 | Menken |
| 3,359,610 A | 12/1967 | Faircloth |
| 3,984,926 A | 10/1976 | Calderon |
| 4,025,974 A | 5/1977 | Lea et al. |
| 4,219,945 A | 9/1980 | Rudy |
| 4,287,250 A | 9/1981 | Rudy |

(Continued)

FOREIGN PATENT DOCUMENTS

| | | |
|---|---|---|
| DE | 10260694 A1 | 6/2004 |
| EP | 0 897 029 A2 | 2/1999 |
| WO | 2005-018363 A1 | 3/2005 |

OTHER PUBLICATIONS

International Search Report and Written Opinion dated Nov. 22, 2013 cited in PCT/US2013/054042.

*Primary Examiner* — Katarzyna Wyrozebski Lee
*Assistant Examiner* — Vishal I Patel
(74) *Attorney, Agent, or Firm* — Plumsea Law Group, LLC

(57) ABSTRACT

A method for manufacturing a fluid-filled chamber may include obtaining a spacer textile material a stabilization structure. A tensile member is removed from an area of the spacer textile material where the stabilizing structure is absent. The tensile member is located between a first polymer element and a second polymer element. Additionally, (a) the first layer is bonded to the first polymer element, (b) the second layer is bonded to the second polymer element, and (c) the first polymer element and the second polymer element are bonded together around a periphery of the tensile member.

20 Claims, 25 Drawing Sheets

(56) References Cited

U.S. PATENT DOCUMENTS

| | | |
|---|---|---|
| 4,364,188 A | 12/1982 | Turner et al. |
| 4,397,104 A | 8/1983 | Doak |
| 4,513,449 A | 4/1985 | Donzis |
| 4,619,055 A | 10/1986 | Davidson |
| 4,761,321 A | 8/1988 | McCall et al. |
| 4,874,640 A | 10/1989 | Donzis |
| 4,906,502 A | 3/1990 | Rudy |
| 5,083,361 A | 1/1992 | Rudy |
| 5,134,790 A | 8/1992 | Woitschaetzke et al. |
| 5,167,999 A | 12/1992 | Wang |
| 5,369,896 A | 12/1994 | Frachey et al. |
| 5,385,036 A * | 1/1995 | Spillane et al. ............ 66/87 |
| 5,543,194 A | 8/1996 | Rudy |
| 5,552,205 A * | 9/1996 | Lea .............................. 428/74 |
| 5,572,804 A | 11/1996 | Skaja et al. |
| 5,589,245 A * | 12/1996 | Roell ............................ 428/85 |
| 5,630,237 A | 5/1997 | Ku |
| 5,713,141 A | 2/1998 | Mitchell et al. |
| 5,741,568 A | 4/1998 | Rudy |
| 5,744,222 A | 4/1998 | Sugihara |
| 5,802,739 A | 9/1998 | Potter et al. |
| 5,918,383 A | 7/1999 | Chee |
| 5,952,065 A | 9/1999 | Mithcell |
| 5,987,781 A | 11/1999 | Pavesi et al. |
| 5,993,585 A | 11/1999 | Goodwin et al. |
| 6,029,962 A | 2/2000 | Shorten et al. |
| 6,041,521 A | 3/2000 | Wong |
| 6,082,025 A | 7/2000 | Bonk |
| 6,098,313 A | 8/2000 | Skaja |
| 6,119,371 A * | 9/2000 | Goodwin et al. ............. 36/29 |
| 6,127,010 A | 10/2000 | Rudy |
| 6,385,864 B1 | 5/2002 | Sell, Jr. et al. |
| 6,668,740 B2 | 12/2003 | Kawamura et al. |
| 6,755,052 B1 * | 6/2004 | Sytz ............................. 66/196 |
| 6,758,068 B2 | 7/2004 | Shirasaki et al. |
| 6,770,581 B1 | 8/2004 | DeMott et al. |
| 6,830,793 B2 | 12/2004 | Hawkins et al. |
| 6,837,951 B2 | 1/2005 | Rapaport |
| 7,060,156 B2 | 6/2006 | Mack et al. |
| 7,070,845 B2 * | 7/2006 | Thomas et al. ............... 428/69 |
| 7,131,218 B2 | 11/2006 | Schindler |
| 7,174,750 B2 | 2/2007 | Shirasaki et al. |
| 7,213,421 B2 | 5/2007 | Shirasaki et al. |
| 7,235,504 B2 | 6/2007 | Shirasaki et al. |
| 7,418,837 B2 | 9/2008 | Muller et al. |
| 7,707,743 B2 | 5/2010 | Schindler et al. |
| 7,774,955 B2 | 8/2010 | Goodwin et al. |
| 7,913,520 B1 | 3/2011 | Chen et al. |
| 8,151,486 B2 | 4/2012 | Dua |
| 8,365,412 B2 * | 2/2013 | Weber et al. ............. 29/897.32 |
| 8,394,221 B2 * | 3/2013 | Rapaport et al. ............ 156/145 |
| 2002/0121031 A1 | 9/2002 | Smith et al. |
| 2003/0096548 A1 | 5/2003 | Groitzsch |
| 2003/0097767 A1 | 5/2003 | Perkinson |
| 2005/0039346 A1 * | 2/2005 | Thomas et al. ................ 36/29 |
| 2005/0097777 A1 | 5/2005 | Goodwin |
| 2007/0169379 A1 | 7/2007 | Hazenberg et al. |
| 2007/0212959 A1 | 9/2007 | Johnson |
| 2009/0288313 A1 | 11/2009 | Rapaport et al. |
| 2009/0300949 A1 | 12/2009 | Frederick et al. |
| 2012/0233880 A1 * | 9/2012 | Chao et al. .................... 36/29 |
| 2013/0266773 A1 | 10/2013 | Hazenberg et al. |

* cited by examiner

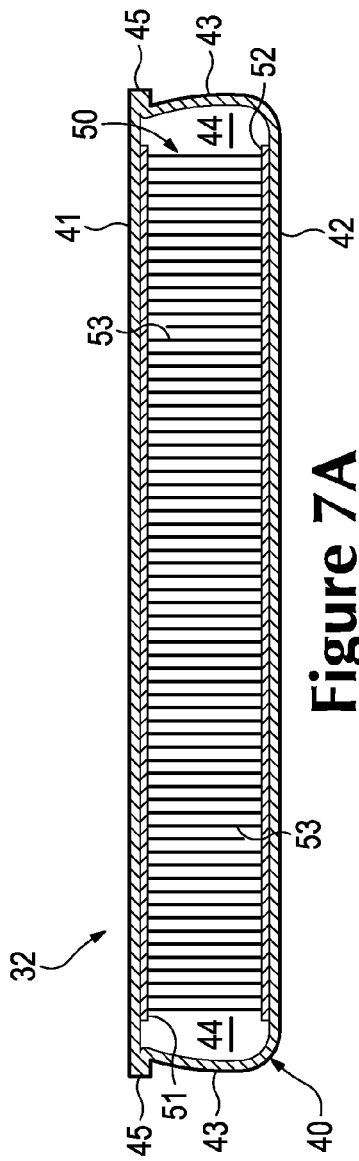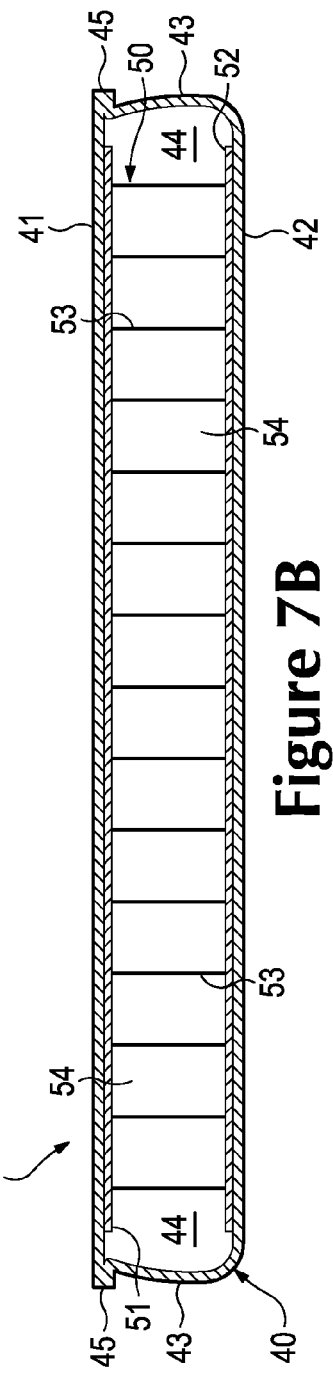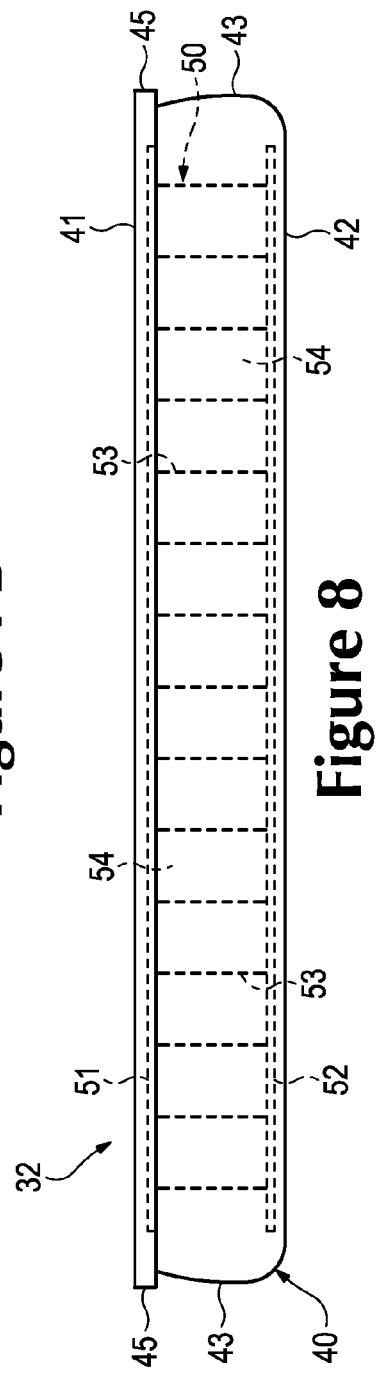

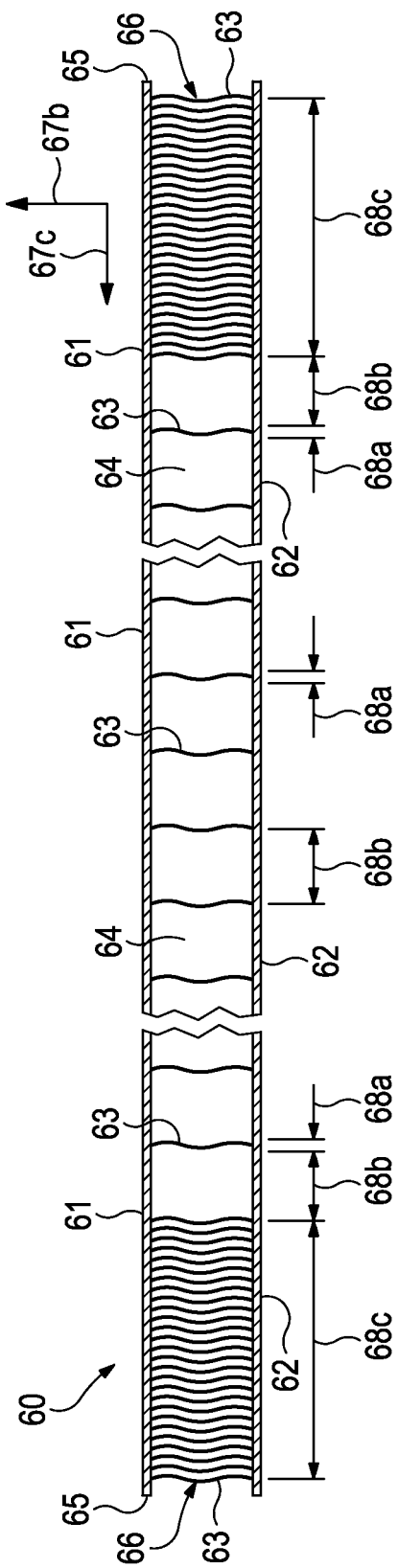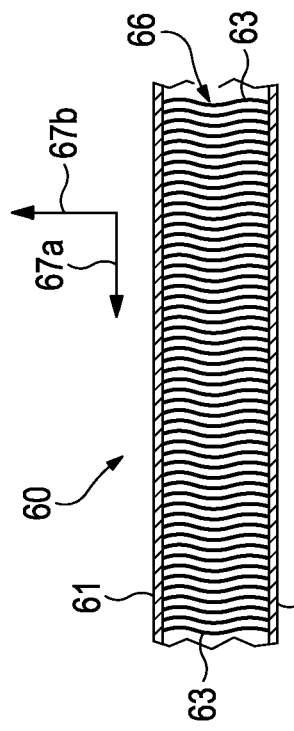
Figure 10A
Figure 10B

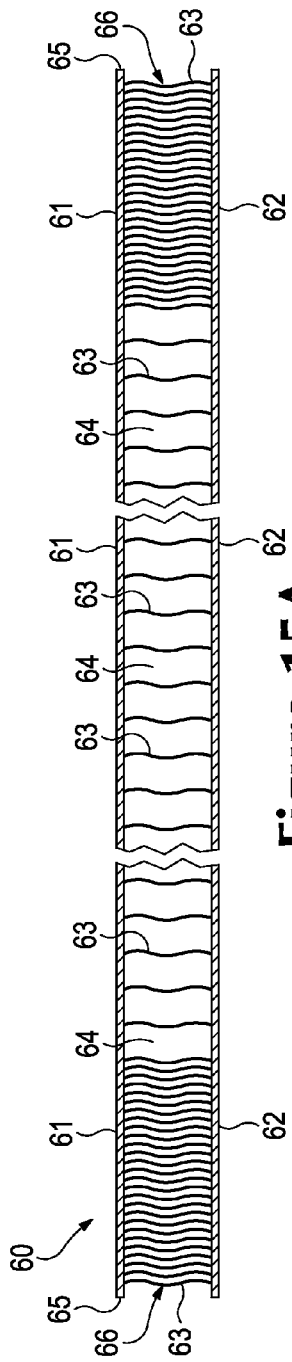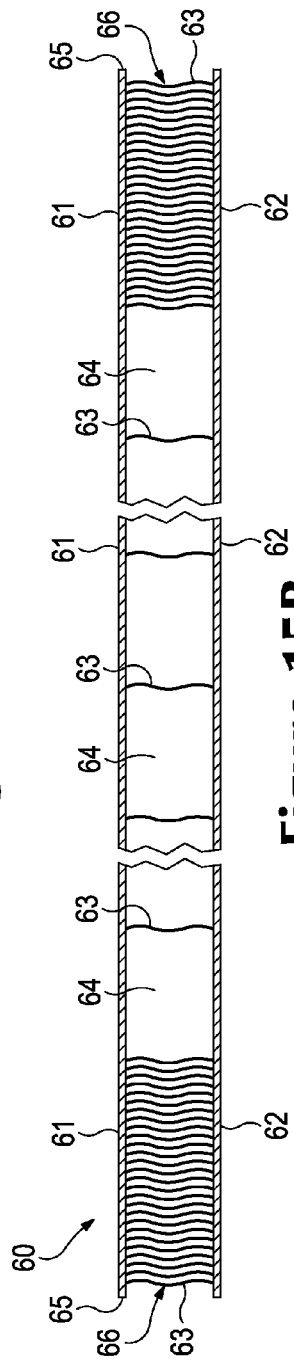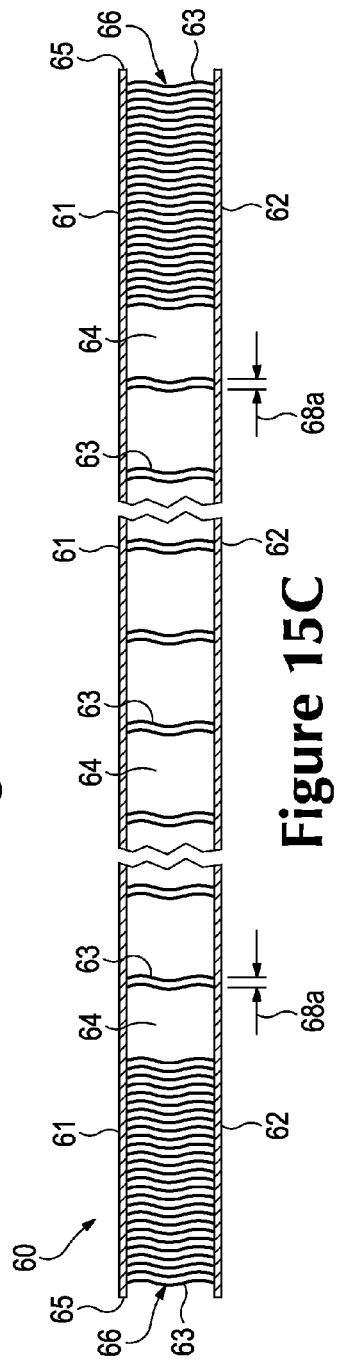

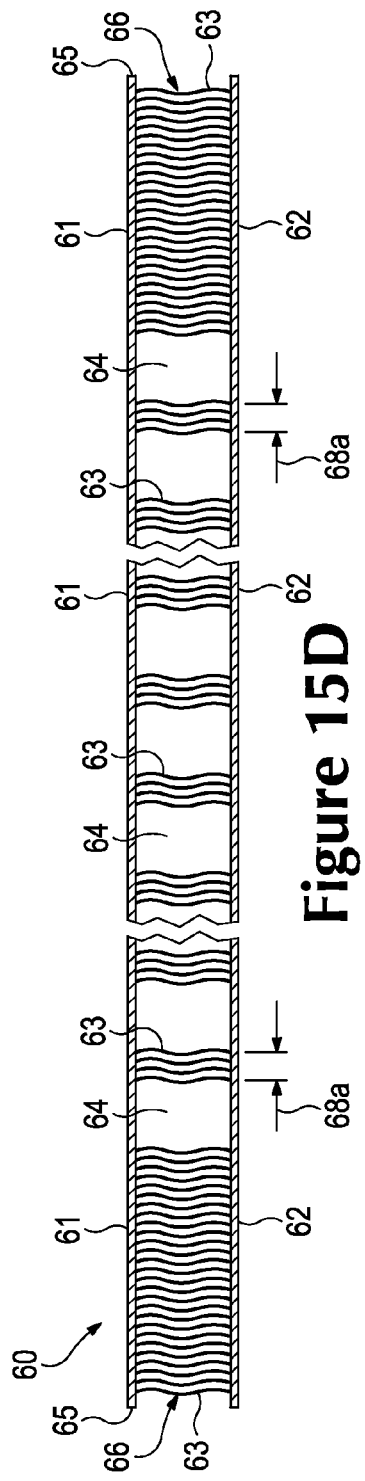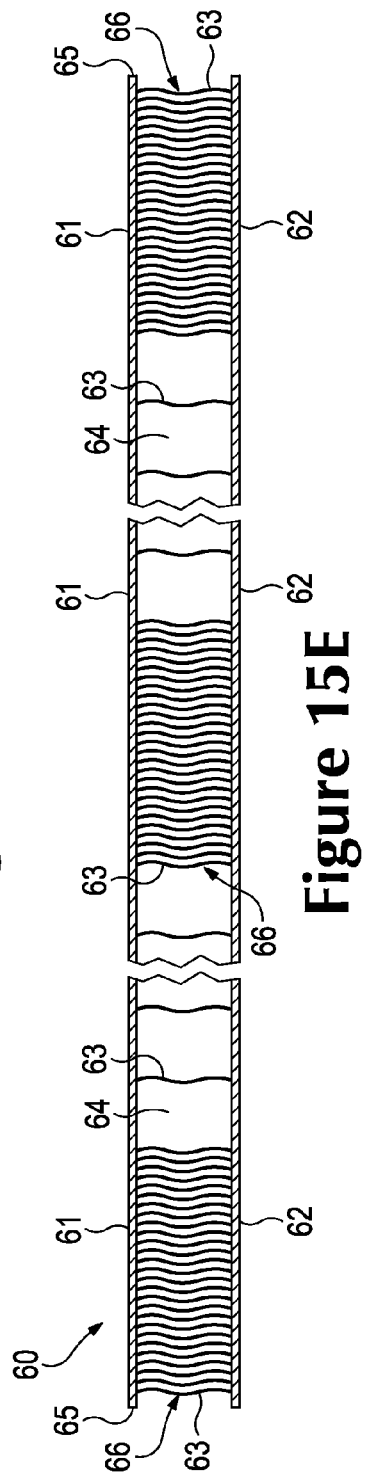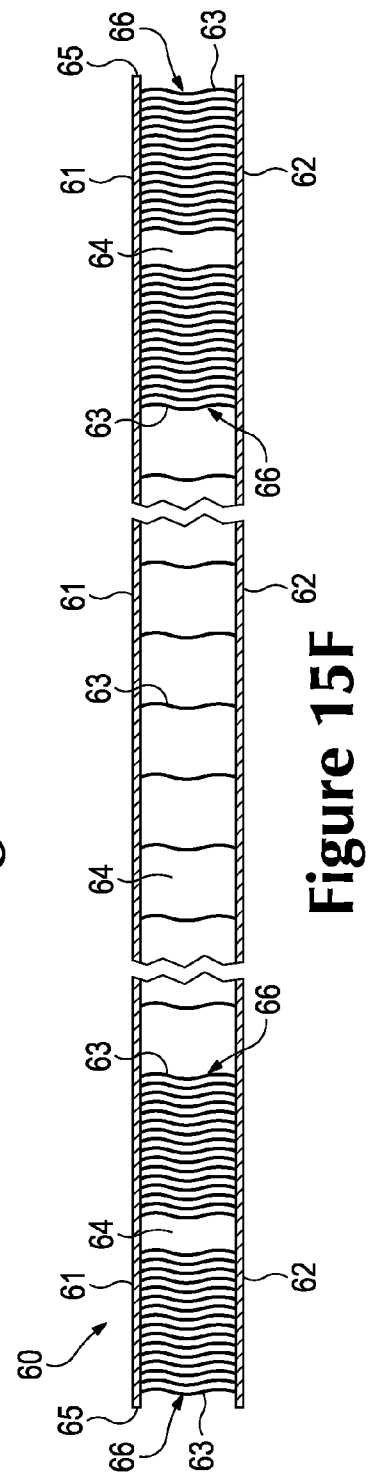

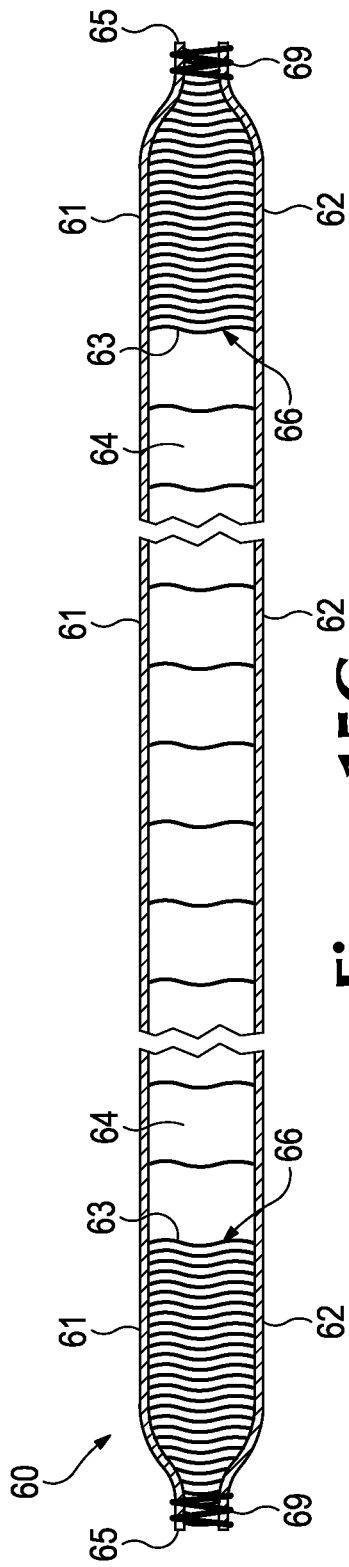
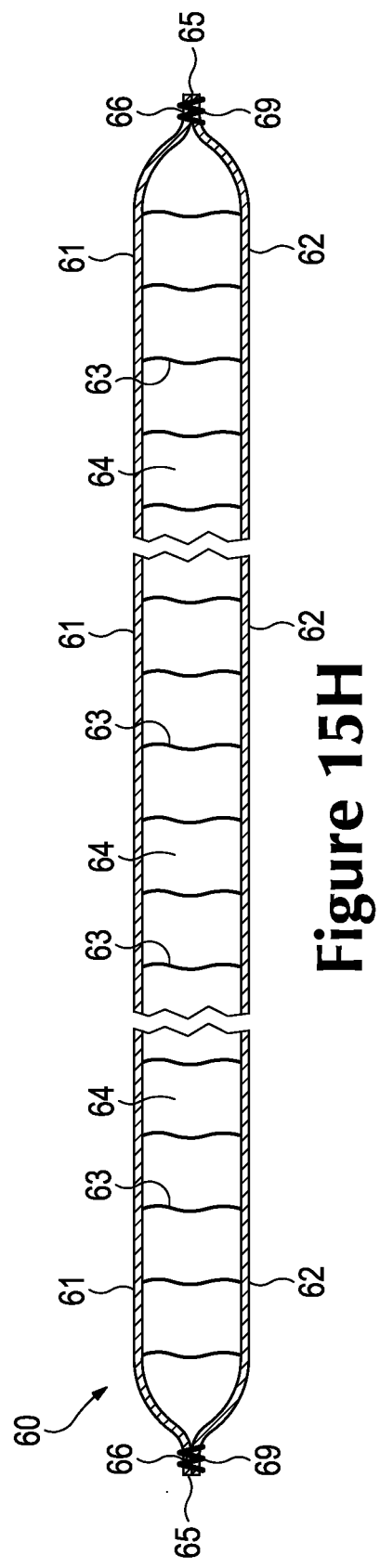

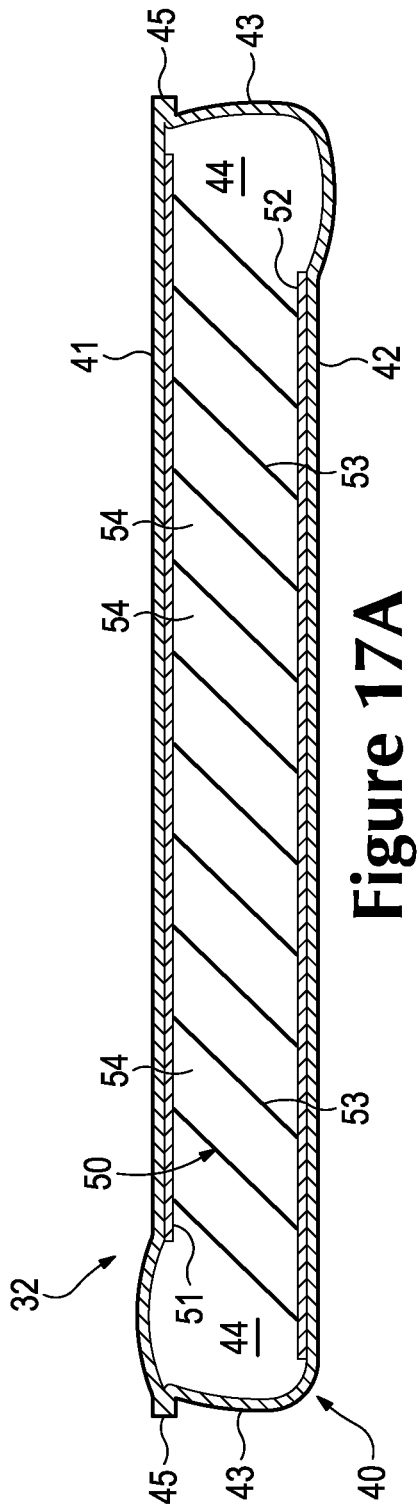
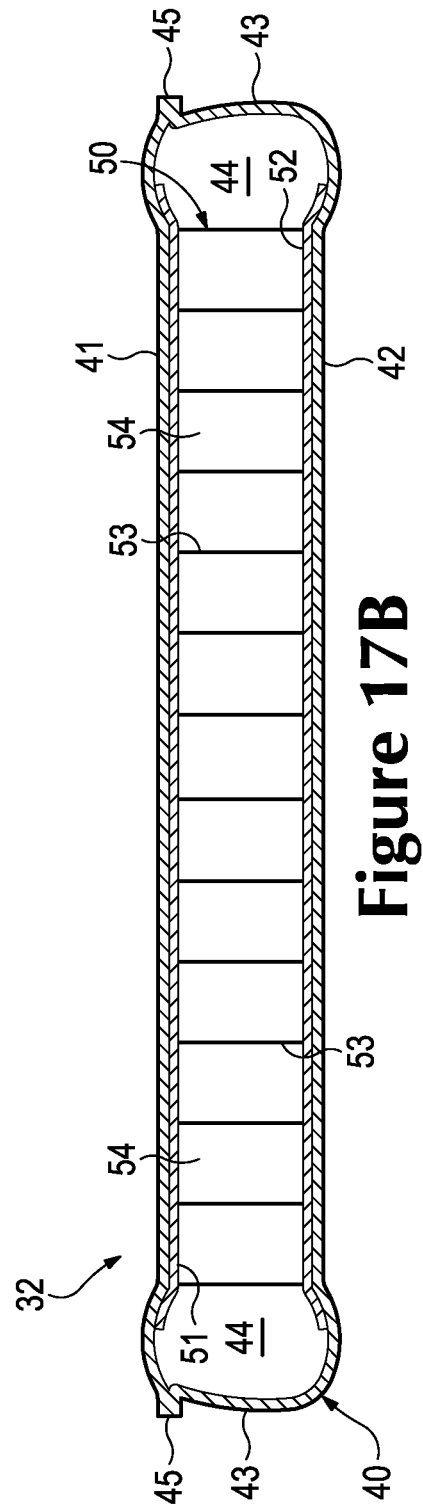
Figure 17A
Figure 17B

US 8,747,593 B2

METHODS FOR MANUFACTURING FLUID-FILLED CHAMBERS INCORPORATING SPACER TEXTILE MATERIALS

CROSS-REFERENCE TO RELATED APPLICATION

This U.S. patent application is a continuation-in-part application and claims priority under 35 U.S.C. §120 to U.S. patent application Ser. No. 13/443,421, which was filed in the U.S. Patent and Trademark Office on 10 Apr. 2012 and entitled Spacer Textile Materials And Methods For Manufacturing The Spacer Textile Materials, such prior U.S. patent application being entirely incorporated herein by reference.

BACKGROUND

Articles of footwear generally include two primary elements: an upper and a sole structure. The upper is often formed from a plurality of material elements (e.g., textiles, polymer sheet layers, polymer foam layers, leather, synthetic leather) that are stitched or adhesively bonded together to form a void within the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter for stabilizing the heel area of the foot.

The sole structure is secured to a lower portion of the upper and positioned between the foot and the ground. In athletic footwear, for example, the sole structure often includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. In some configurations, the midsole may be primarily formed from a fluid-filled chamber. The outsole forms a ground-contacting element of the footwear and is usually fashioned from a durable and wear-resistant rubber material that includes texturing to impart traction. The sole structure may also include a sockliner positioned within the void of the upper and proximal a lower surface of the foot to enhance footwear comfort.

SUMMARY

A spacer textile material may include a first layer, a second layer, and a plurality of connecting members extending between and joining the first layer and the second layer. The connecting members may form a series of at least ten rows that are separated by spaces. The rows have a width that is less than a width of the spaces, and the connecting members form at least one stabilizing row with a width that is greater than the width of the spaces.

A method for manufacturing a fluid-filled chamber may include obtaining a spacer textile material having a first layer, a second layer, and a plurality of connecting members extending between and joining the first layer and the second layer. The connecting members form a series of at least ten rows that are separated by spaces. The rows have a width that is less than a width of the spaces, and the connecting members form at least one stabilizing row with a width that is greater than the width of the spaces. A tensile member is removed from an area of the spacer textile material where the stabilizing row is absent. The tensile member is located between a first polymer element and a second polymer element. Additionally, (a) the first layer is bonded to the first polymer element, (b) the second layer is bonded to the second polymer element, and (c) the first polymer element and the second polymer element are bonded together around a periphery of the tensile member.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 7A and 7B are cross-sectional views of the chamber, as defined by section lines 7A and 7B in FIG. 6.

FIG. 8 is a side elevational view of the chamber.

FIGS. 10A and 10B are cross-sectional views of the spacer textile material, as defined by section lines 10A and 10B in FIG. 9.

FIGS. 15A-15H are cross-sectional views corresponding with FIG. 10A and depicting further configurations of the spacer textile material.

FIGS. 17A and 17B are cross-sectional views corresponding with FIG. 7B and depicting further configurations of the chamber.

DETAILED DESCRIPTION

The following discussion and accompanying figures disclose various configurations of a fluid-filled chamber and methods for manufacturing the chamber. Although the chamber is disclosed with reference to footwear having a configuration that is suitable for running, concepts associated with the chamber may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chamber may also be utilized with footwear styles that are generally considered to be non-athletic, including dress shoes, loafers, sandals, and work boots. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Additionally, the discussion and figures disclose various configurations of a spacer textile material. Although portions of the spacer textile material are disclosed as being incorporated into the chamber, the spacer textile material may be utilized with a variety of other products or for a variety of other purposes.

General Footwear Structure

Figure 1:
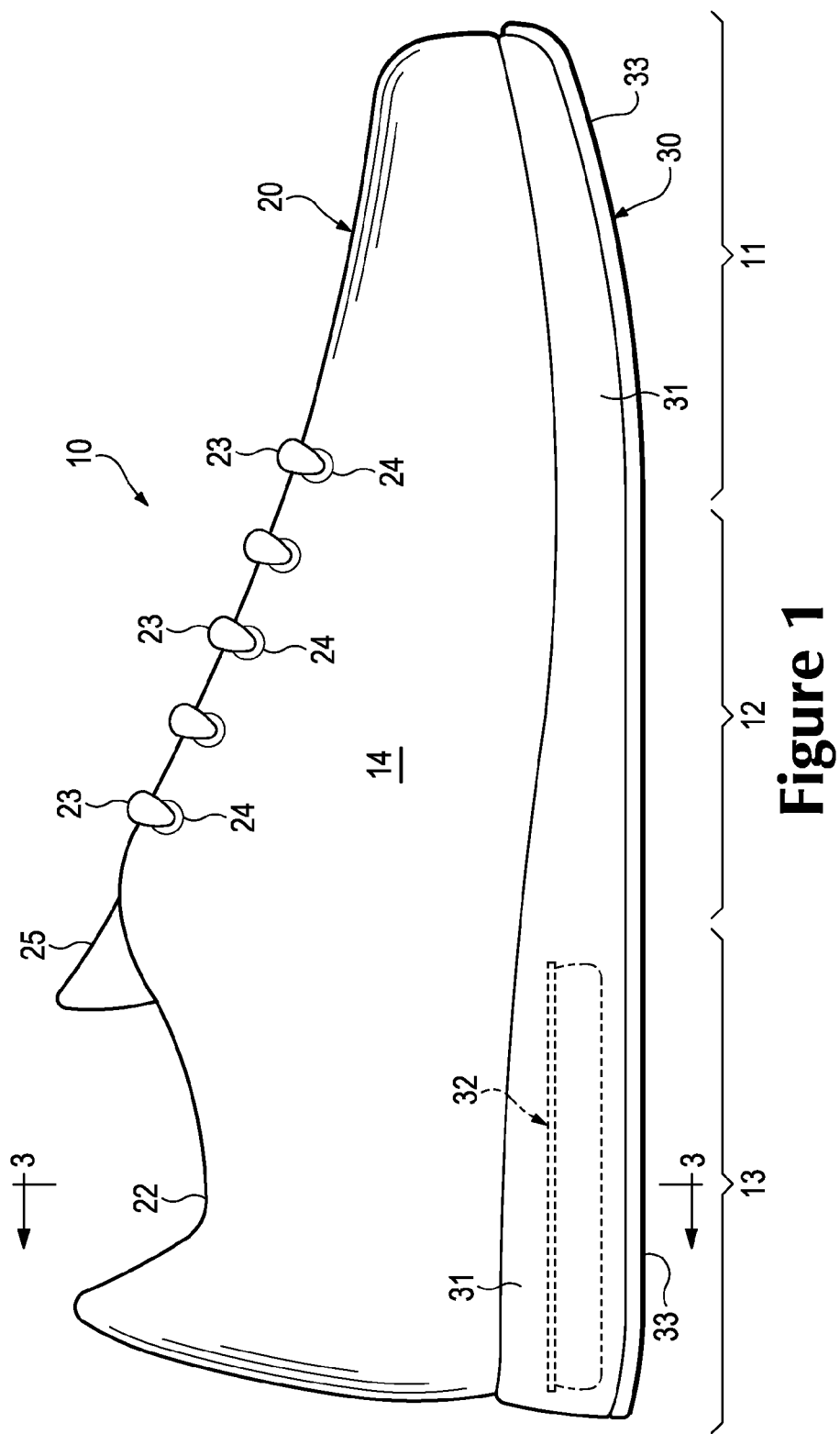
FIG. 1 is a lateral side elevational view of an article of footwear incorporating a fluid-filled chamber.
Figure 2:
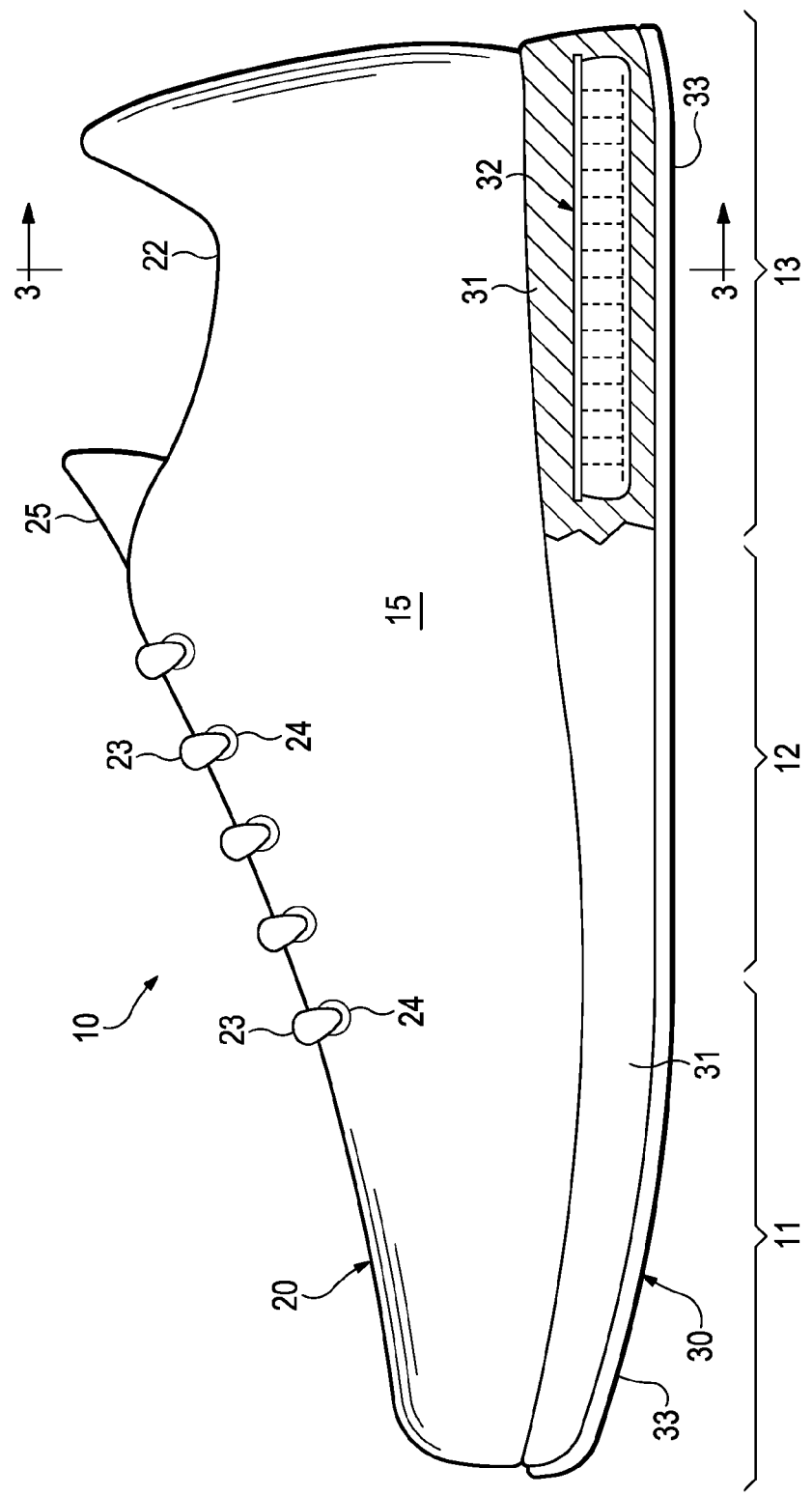
FIG. 2 is a medial side elevational view of the article of footwear.
Figure 3:
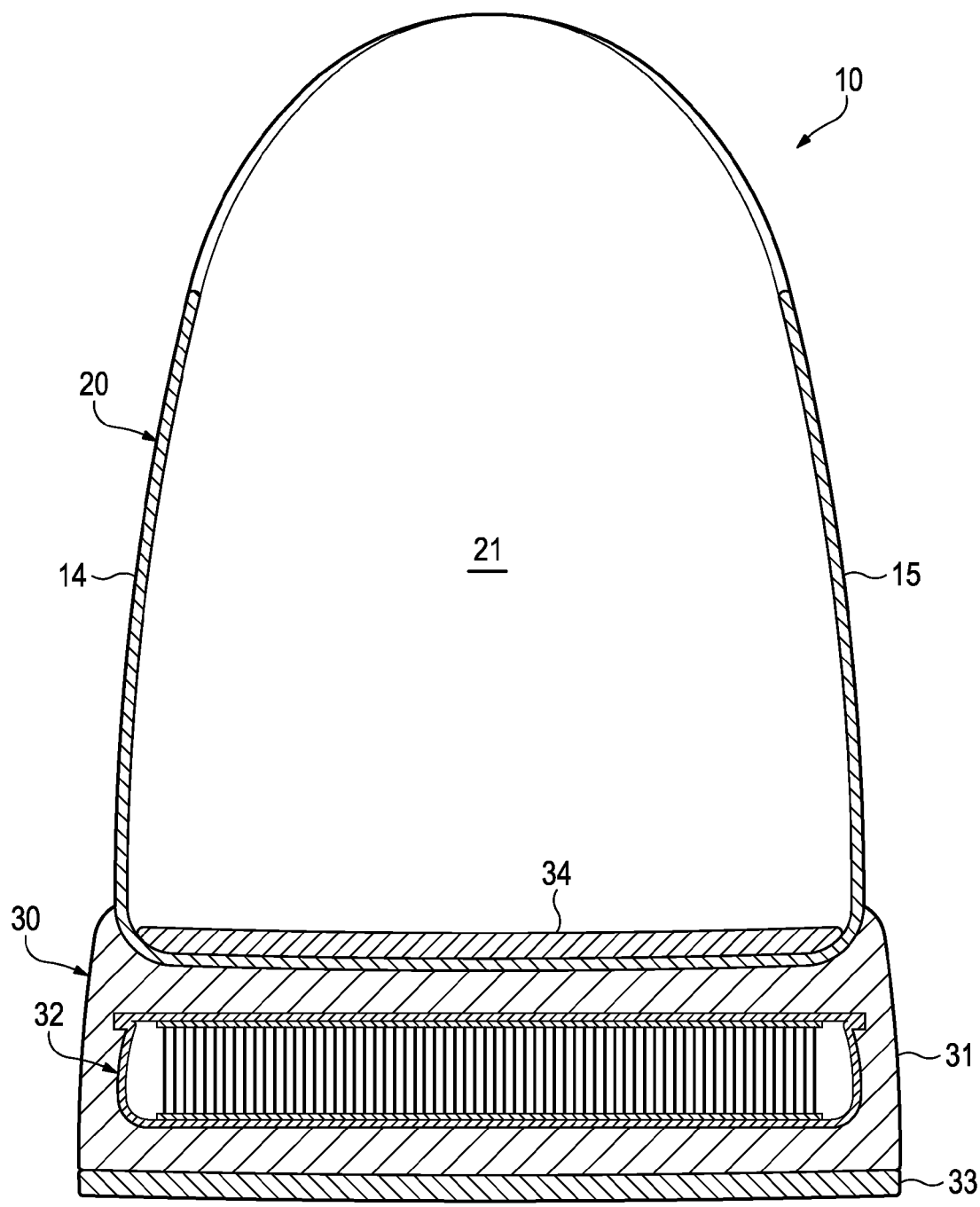
FIG. 3 is a cross-sectional view of the article of footwear, as defined by section line 3 in FIGS. 1 and 2.
Figure 4:
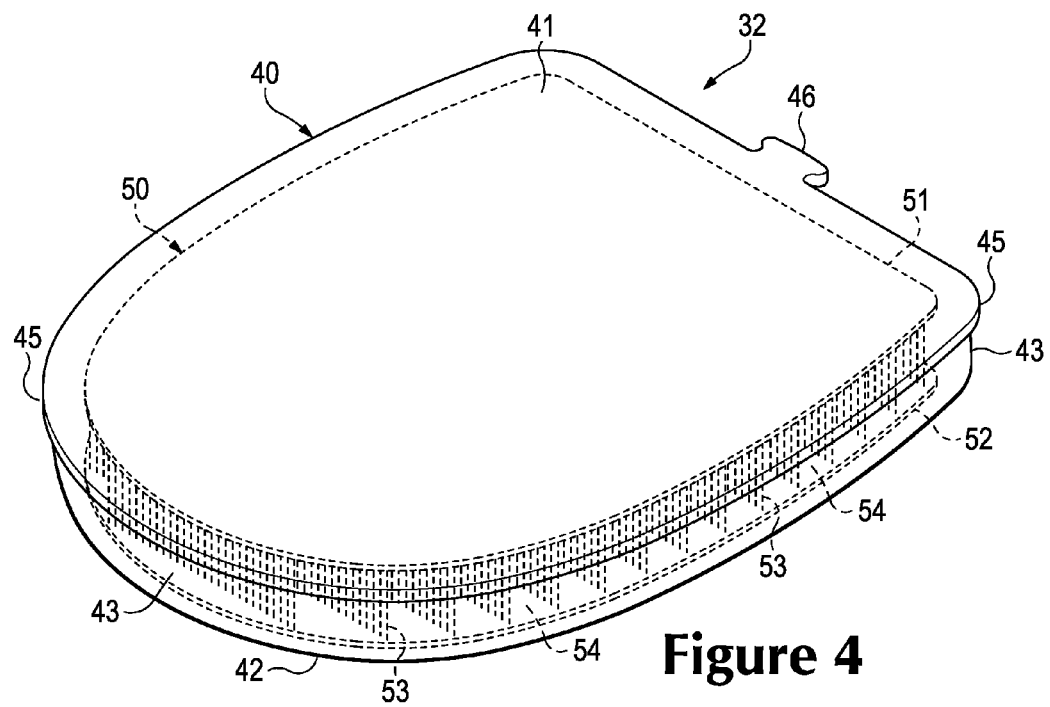
FIG. 4 is a perspective view of the chamber.

An article of footwear 10 is depicted in FIGS. 1-3 as including an upper 20 and a sole structure 30. Upper 20 provides a comfortable and secure covering for a foot of a wearer. As such, the foot may be located within upper 30 to effectively secure the foot within footwear 10. Sole structure 30 is secured to a lower area of upper 20 and extends between upper 20 and the ground. When the foot is located within upper 20, sole structure 30 extends under the foot to attenuate ground reaction forces (i.e., cushion the foot), provide traction, enhance stability, and influence the motions of the foot, for example.

For purposes of reference in the following discussion, footwear 10 may be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which extend through each of regions 11-13 and correspond with opposite sides of footwear 10. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration formed from a variety of elements (e.g., textiles, polymer sheet layers, polymer foam layers, leather, synthetic leather) that are stitched, bonded, or otherwise joined together to provide a structure for receiving and securing the foot relative to sole structure 30. The various elements of upper 20 define a void 21, which is a generally hollow area of footwear 10 with a shape of the foot, that is intended to receive the foot. As such, upper 20 extends along the lateral side of the foot, along the medial side of the foot, over the foot, around a heel of the foot, and under the foot. Access to void 21 is provided by an ankle opening 22 located in at least heel region 13. A lace 23 extends through various lace apertures 24 and permits the wearer to modify dimensions of upper 20 to accommodate the proportions of the foot. More particularly, lace 23 permits the wearer to tighten upper 20 around the foot, and lace 23 permits the wearer to loosen upper 20 to facilitate entry and removal of the foot from void 21 (i.e., through ankle opening 22). As an alternative to lace apertures 24, upper 20 may include other lace-receiving elements, such as loops, eyelets, hooks, and D-rings. In addition, upper 20 includes a tongue 25 that extends between void 21 and lace 23 to enhance the comfort and adjustability of footwear 10. In some configurations, upper 20 may incorporate other elements, such as reinforcing members, aesthetic features, a heel counter that limits heel movement in heel region 13, a wear-resistant toe guard located in forefoot region 11, or indicia (e.g., a trademark) identifying the manufacturer. Accordingly, upper 20 is formed from a variety of elements that form a structure for receiving and securing the foot.

The primary elements of sole structure 30 are a midsole 31, a fluid-filled chamber 32, an outsole 33, and a sockliner 34. Midsole 31 may be formed from a polymer foam material, such as polyurethane or ethylvinylacetate, that encapsulates chamber 32. In addition to the polymer foam material and chamber 32, midsole 31 may incorporate one or more additional footwear elements that enhance the comfort, performance, or ground reaction force attenuation properties of footwear 10, including plates, moderators, lasting elements, or motion control members, for example. Although absent in some configurations, outsole 33 is secured to a lower surface of midsole 31 and may be formed from a rubber material that provides a durable and wear-resistant surface for engaging the ground. In addition, outsole 33 may be textured to enhance the traction (i.e., friction) properties between footwear 10 and the ground. Sockliner 34 is a compressible member located within void 21 and adjacent a lower surface of the foot to enhance the comfort of footwear 10.

Chamber Configuration

Chamber 32 is depicted individually in FIGS. 4-8 as having a configuration that is suitable for footwear applications. When incorporated into footwear 10, chamber 32 has a shape that fits within a perimeter of midsole 31 and extends through a majority of heel region 13. Chamber 32 also extends from lateral side 14 to medial side 15. Although the polymer foam material of midsole 31 is depicted as extending entirely around chamber 32, the polymer foam material of midsole 31 may expose portions of chamber 32. For example, chamber 32 may form a portion of (a) a sidewall of midsole 31 or (b) an upper or lower surface of midsole 31 in some configurations of footwear 10. When the foot is located within upper 20, chamber 32 extends under substantially all of a heel of the foot in order to attenuate ground reaction forces that are generated when sole structure 30 is compressed between the foot and the ground during various ambulatory activities, such as running and walking. In other configurations where chamber 32 has a different shape or structure, chamber 32 may extend under other areas of the foot or may extend throughout a length of sole structure 30.

The primary elements of chamber 32 are a barrier 40 and a tensile member 50. Barrier 40 is formed from a polymer material that defines a first or upper barrier portion 41, an opposite second or lower barrier portion 42, and a sidewall barrier portion 43 that extends around a periphery of chamber 32 and between barrier portions 41 and 42. In addition, portions 41-43 (a) form an exterior of chamber 32, (b) define an interior void 44 that receives both a pressurized fluid and tensile member 50, and (c) provide a durable and sealed structure for retaining the pressurized fluid within chamber 32. Tensile member 50 is located within interior void 44 and includes a first or upper layer 51, an opposite second or lower layer 52, and a plurality of connecting members 53 that extend between layers 51 and 52 and are arranged in various substantially parallel rows. Whereas upper layer 51 is secured to an inner surface of upper barrier portion 41, lower layer 52 is secured to an inner surface of lower barrier portion 42. Examples of chambers that include tensile members are disclosed in (a) U.S. patent application Ser. No. 12/123,612, which was filed in the U.S. Patent and Trademark Office on 20 May 2008 and entitled Fluid-Filled Chamber With A Textile Tensile Member; (b) U.S. patent application Ser. No. 12/123,646, which was filed in the U.S. Patent and Trademark Office on 20 May 2008 and entitled Contoured Fluid-Filled Chamber With A Tensile Member; and (c) U.S. Pat. No. 7,070,845 to Thomas, et al., each of which is incorporated herein by reference.

Tensile member 50 is formed from a spacer textile material. A manufacturing process, which will be discussed in greater detail below, may be utilized to form tensile member 50 from at least one yarn. That is, the manufacturing process may knit or otherwise manipulate one or more yarns to (a) form layers 51 and 52 to have the configuration of knitted elements, (b) extend connecting members 53 between layers 51 and 52, and (c) join connecting members 53 to each of layers 51 and 52. Each of connecting members 53 may, therefore, be sections or segments of one or more yarns that extend between and join layers 51 and 52.

Figure 5:
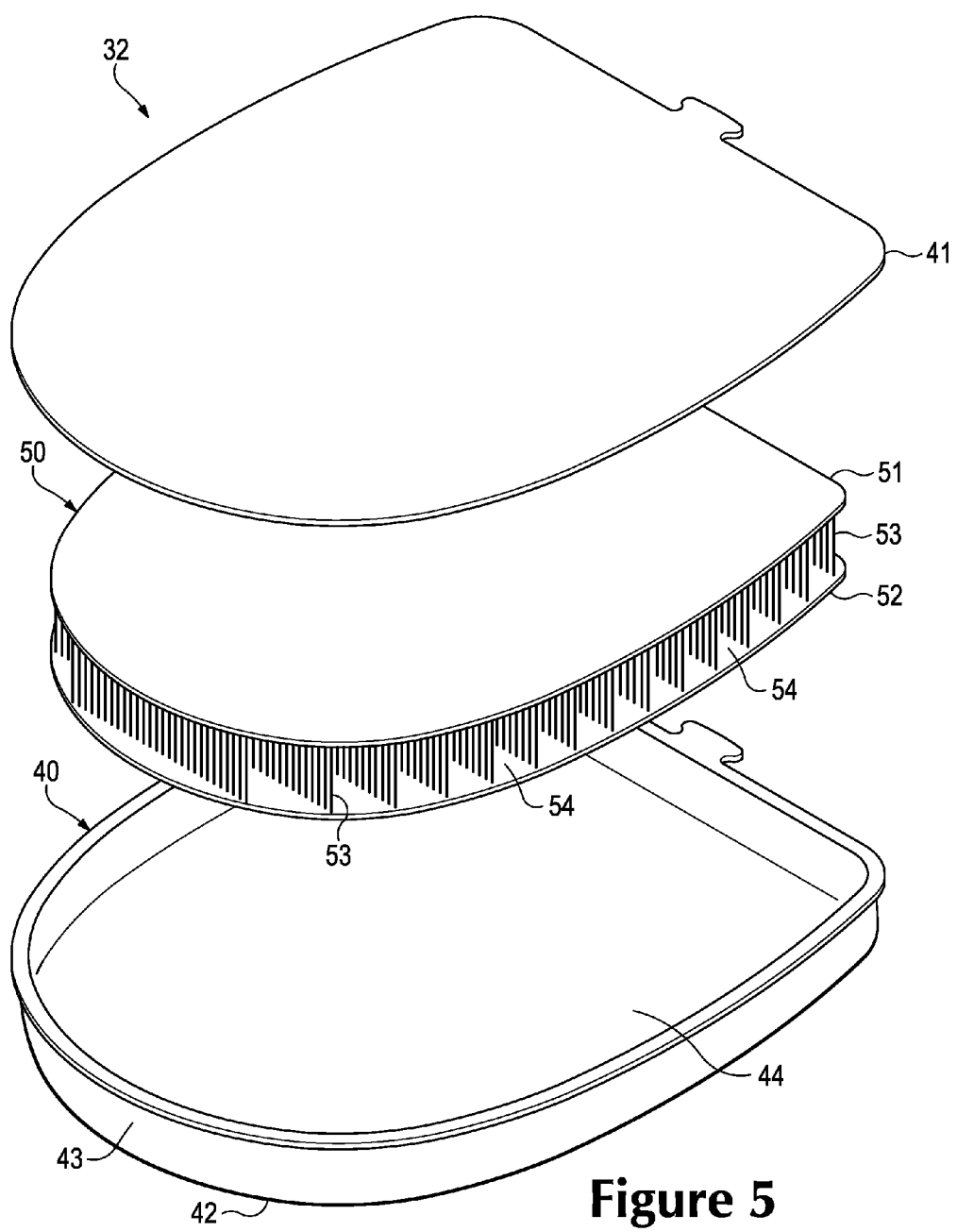
FIG. 5 is an exploded perspective view of the chamber.
Figure 6:
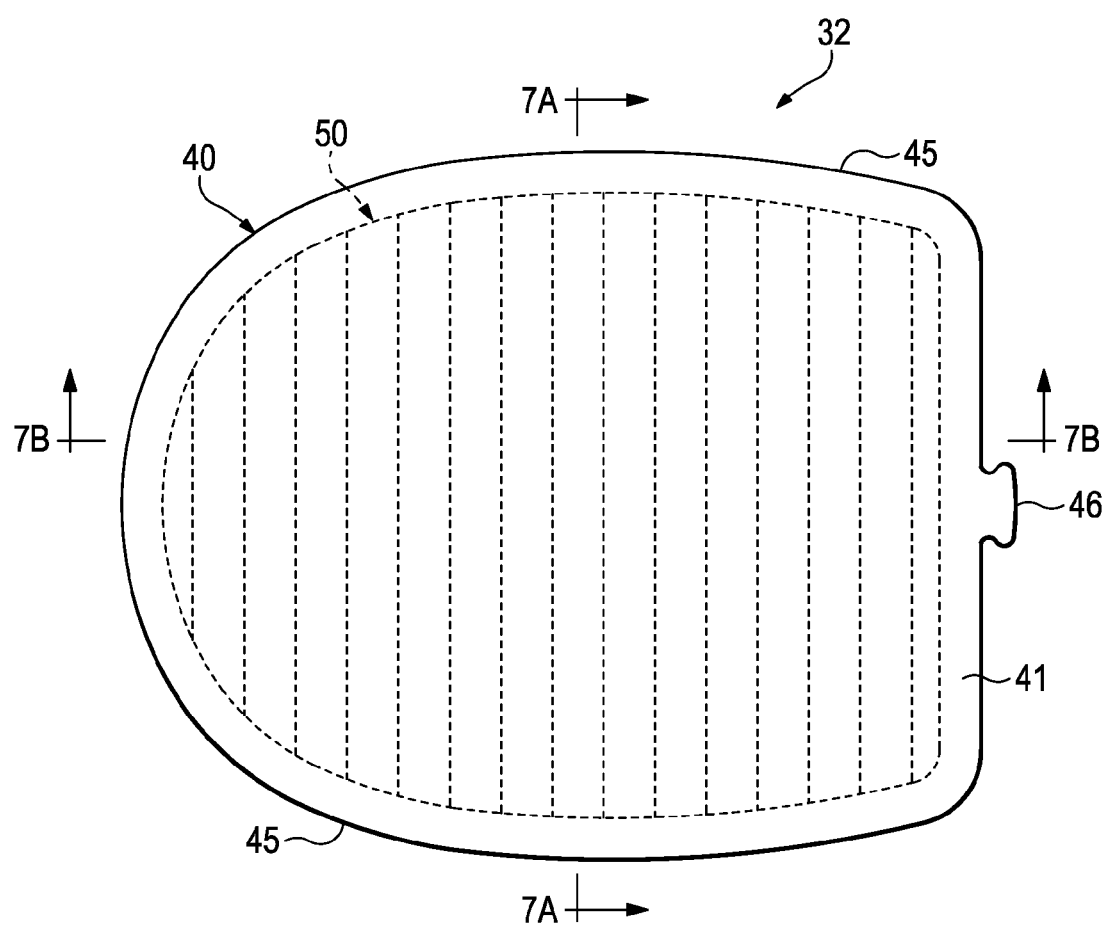
FIG. 6 is a plan view of the chamber.

Connecting members 53 form a series of rows that are separated by various spaces 54, as depicted in FIGS. 5, 7B, and 8. The presence of spaces 54 provides tensile member 50 with increased compressibility, lesser weight, and more efficient manufacture in comparison to other tensile members that utilize continuous connecting members without spaces. The rows formed by connecting members 53 are substantially parallel to each other and equidistant from each other. That is, a distance between two adjacent rows formed by connecting members 53 may be the same as a distance between two other adjacent rows formed by connecting members 53. In general, therefore, the rows formed by connecting members 53 are substantially parallel to each other and distributed at substantially equal distances across tensile member 50.

A manufacturing process for chamber 32 generally involves (a) securing a pair of polymer sheets, which form barrier portions 41-43, to opposite sides of tensile member 50 (i.e., to layers 51 and 52) and (b) forming a peripheral bond 45 that joins a periphery of the polymer sheets and extends around sidewall barrier portion 43. One or both of the polymer sheets forming barrier portions 41-43 may also be thermoformed, molded, or otherwise shaped during the process. A pressurized fluid is then injected into interior void 44 through an inlet 46, which is then sealed. The fluid exerts an outward force upon barrier 40, which tends to separate barrier portions 41 and 42. Tensile member 50, however, is secured to each of barrier portions 41 and 42 in order to retain the intended shape (e.g., generally planar shape) of chamber 32 when pressurized. More particularly, connecting members 53 extend across the interior void and are placed in tension by the outward force of the pressurized fluid upon barrier 40, thereby preventing barrier 40 from expanding or bulging outward. Whereas peripheral bond 45 joins the polymer sheets to form a seal that prevents the fluid from escaping, tensile member 50 prevents barrier 40 from expanding outward or otherwise distending due to the pressure of the fluid. That is, tensile member 50 effectively limits the expansion of barrier portions 41 and 42 to retain the intended shape of chamber 32. Although chamber 32 is depicted as having a generally planar shape, chamber 32 (i.e., barrier portions 41 and 42) may also be contoured, as disclosed in U.S. patent application Ser. Nos. 12/123,612 and 12/123,646, which were mentioned above and are incorporated herein by reference.

In order to facilitate bonding between tensile member 50 and barrier 40, polymer bonding layers may be applied to each of layers 51 and 52. When heated, the bonding layers soften, melt, or otherwise begin to change state so that contact with barrier portions 41 and 42 induces material from each of barrier 40 and the bonding layers to intermingle or otherwise join with each other. Upon cooling, the bonding layers are permanently joined with barrier 40, thereby joining barrier 40 and tensile member 50. In some configurations, thermoplastic threads or strips may be present within layers 51 and 52 to facilitate bonding with barrier 40, as disclosed in U.S. Pat. No. 7,070,845, which was mentioned above and is incorporated herein by reference. An adhesive may also be utilized to assist with securing barrier 40 and tensile member 50.

A wide range of polymer materials may be utilized for barrier 40. In selecting materials for barrier 40, engineering properties of the material (e.g., tensile strength, stretch properties, fatigue characteristics, and dynamic modulus) and the ability of the material to prevent diffusion of the fluid contained by barrier 40 may be considered. When formed of thermoplastic urethane, for example, barrier 40 may have a thickness of approximately 1.0 millimeter, but the thickness may range from 0.2 to 4.0 millimeters or more, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein layers include ethylene-vinyl alcohol copolymer, thermoplastic polyurethane, and a regrind material of the ethylene-vinyl alcohol copolymer and thermoplastic polyurethane. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

The fluid within chamber 32 may be pressurized between zero and three-hundred-fifty kilopascals (i.e., approximately fifty-one pounds per square inch) or more. In addition to air and nitrogen, the fluid may include octafluorapropane or be any of the gasses disclosed in U.S. Pat. No. 4,340,626 to Rudy, such as hexafluoroethane and sulfur hexafluoride. In some configurations, chamber 32 may incorporate a valve or other structure that permits the wearer to adjust the pressure of the fluid.

Spacer Textile Material

Figure 9:
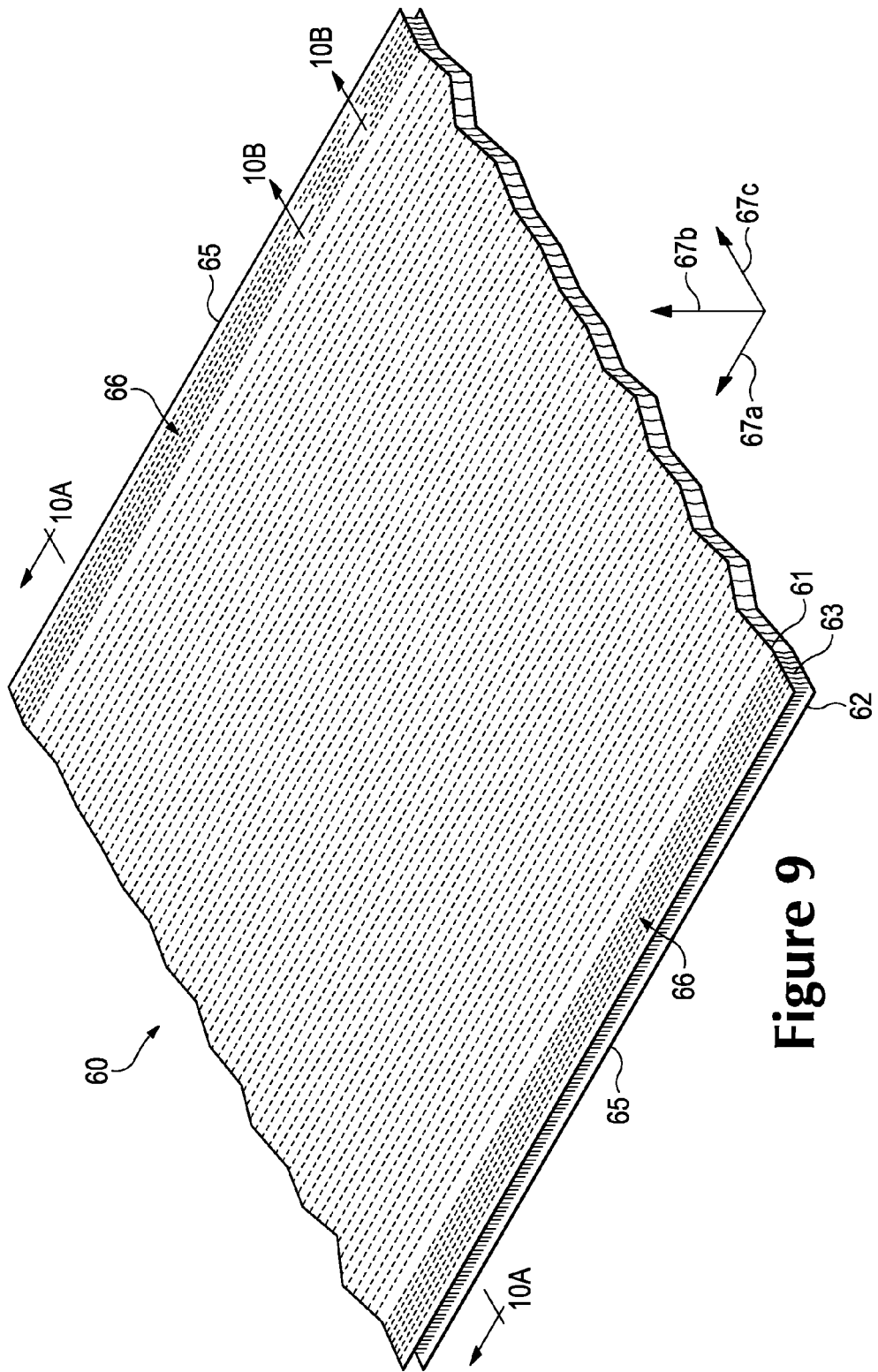
FIG. 9 is a perspective view of a spacer textile material.

A spacer textile material 60 (e.g., a spacer mesh material or spacer-knit textile material) is depicted in FIGS. 9, 10A, and 10B. Spacer textile material 60 may be utilized to form tensile member 50. More particularly, an element having the shape of tensile member 50 may be cut or otherwise removed from spacer textile material 60 to form tensile member 50. In general, therefore, portions of spacer textile material 60 have a configuration that is similar to tensile member 50. Spacer textile material 60 includes a first layer 61, a second layer 62 that is at least partially coextensive with first layer 61, and a plurality of connecting members 63 that extend between and join layers 61 and 62. Connecting members 63 are arranged to form a series of rows that are separated by various spaces 64. The rows formed by connecting members 63 are substantially parallel to each other and distributed at substantially equal distances across tensile member 60. Spaces 64 are areas within spacer textile material 60 where connecting members 63 are absent, typically areas between the rows formed by connecting members 63. Spacer textile material 60 also defines a pair of opposite edges 65, which are also edges of layers 61 and 62. Each of edges 65 are substantially parallel to the rows formed by connecting members 63.

Although tensile member 50 may be cut or otherwise removed from spacer textile material 60, a comparison between FIGS. 7B and 10A will reveal that (a) connecting members 53 are straight in FIG. 7B and (b) connecting members 63 are wavy or otherwise non-linear in FIG. 10A. As noted above, connecting members 53 extend across the interior void of chamber 32 and are placed in tension by the outward force of the pressurized fluid upon barrier 40. The tension in connecting members 53 imparts, therefore, the straight structure shown in FIG. 7B. Given that no comparable tension is placed upon spacer textile material 60, connecting members 63 are loose, partially collapsed, or otherwise non-tensioned to impart the wavy or otherwise non-linear structure shown in FIG. 10A.

An advantage of spacer textile 60 relates to the presence of two stabilization structures 66. Although stabilization structures 66 may have various configurations, as discussed below, stabilization structures 66 are depicted in FIGS. 9, 10A, and 10B as areas of spacer textile 60 with a relatively high concentration of connecting members 63. As an example of location, FIGS. 9 and 10A depict stabilization structures 66 as being located adjacent to edges 65. In comparison with the various rows formed by connecting members 63 located in a central area of spacer textile material 60, stabilization structures 66 have greater width and a greater concentration or density of connecting members 63. In some configurations, therefore, stabilization structures 66 may be rows of connecting members 63 with a greater width and a greater concentration. In general, the two stabilization structures 66 hold layers 61 and 62 in proper alignment with each other and resist forces that would otherwise shift layers 61 and 62. The manner in which stabilization structures 66 retain the proper alignment of layers 61 and 62 will be discussed in greater detail below.

For purposes of reference in the following discussion, various directions corresponding with a length, height, and width of spacer textile material 60 will now be defined. Various axes defining a length direction 67a, a height direction 67b, and a width direction 67c is depicted in FIG. 9. Length direction 67a generally corresponds with a length of spacer textile material 60 and extends in a direction that is (a) parallel to layers 61 and 62 and (b) parallel to the various rows formed by connecting members 63. As such, each of the rows formed by connecting members 63 are oriented to extend along length direction 67a. Height direction 67b generally corresponds with a height of spacer textile material 60 and extends in a direction that is perpendicular to layers 61 and 62. As such, individual connecting members 63 extend along height direction 67b. Due to the presence of stabilization structures 66, areas where each individual connecting member 63 is joined to first layer 61 and second layer 62 are aligned in height direction 67b. Width direction 67c generally corresponds with a width of spacer textile material 60 and extends in a direction that is (a) parallel to layers 61 and 62 and (b) perpendicular to the various rows formed by connecting members 63. As such, width direction 67c is oriented in a direction that extends between edges 65.

The cross-section of FIG. 10A depicts a section of spacer textile material 60 that extends along height direction 67b and width direction 67c. As a result, FIG. 10A depicts a cross-section of a height and a width of spacer textile material 60. Additionally, the widths of various rows formed by connecting members 63 and the various spaces 64 located between connecting members 63 are depicted. More particularly, FIG. 10A depicts multiple row widths 68a, space widths 68b, and stabilization widths 68c. Row widths 68a represent the width of an individual row formed by various connecting members 63. Space widths 68b represent the width of an individual space 64 between two adjacent rows formed by connecting members 63. Although the distance associated with each of space widths 68b may vary significantly, space widths 68b are generally greater distances than row widths 68a. Stabilization widths 68c represent the width of each stabilization structure 66. Although the distance associated with each of stabilization widths 68c may vary significantly, stabilization widths 68c are generally greater distances than row widths 68a and space widths 68b. In general, therefore, the widths of stabilization structures 66 are greater than the widths of spaces 64, and the widths of spaces 64 are greater than the widths of the rows formed by connecting members 63. Although this relationship between the various widths provides a suitable structure to spacer textile material 60, other relationships between the widths may be suitable for other configurations of spacer textile materials.

Based upon the above discussion, the distance associated with row widths 68a is generally less than the distance associated with space widths 68b, and the distance associated with space widths 68b is generally less than the distance associated with stabilization widths 68c. As noted above, the presence of spaces 54 provides tensile member 50 with increased compressibility, lesser weight, and more efficient manufacture in comparison to other tensile members that utilize continuous connecting members without spaces. Given that tensile member 50 comes from spacer textile material 60, the presence of spaces 64 provides portions of spacer textile material 60 with increased compressibility, lesser weight, and more efficient manufacture in comparison to other spacer textile materials that utilize continuous connecting members without spaces. Moreover, by forming space widths 68b to be larger than row widths 68a, greater compressibility and lesser weight is imparted to spacer textile material 60. Also as noted above, an advantage of spacer textile 60 relates to the presence of stabilization structures 66, which retain the proper alignment of layers 61 and 62. By forming stabilization widths 68c to have be relatively large (e.g., larger than space widths 68b), the ability of each stabilization structure 66 to retain alignment of layers 61 and 62 is enhanced.

In some configurations of spacer textile material 60, the rows formed by connecting members 63 have a width formed by a single connecting member 63, thereby having a width of a single section of yarn. The widths of stabilization structures 66, however, may include multiple connecting members 63. In some configurations, the rows formed by connecting members 63 rows have a width formed by less than five connecting members 63 or the yarn sections, and stabilization structures 66 have a width formed by at least five of connecting members 63 or the yarn sections. As such, stabilization structures 66 have sufficient width to resist misalignment of layers 61 and 62. In some configurations, a width of stabilization structures 66 may be at least five times or ten times a width of each row formed by connecting members 63 to also impart sufficient width to resist misalignment of layers 61 and 62.

Figure 11:
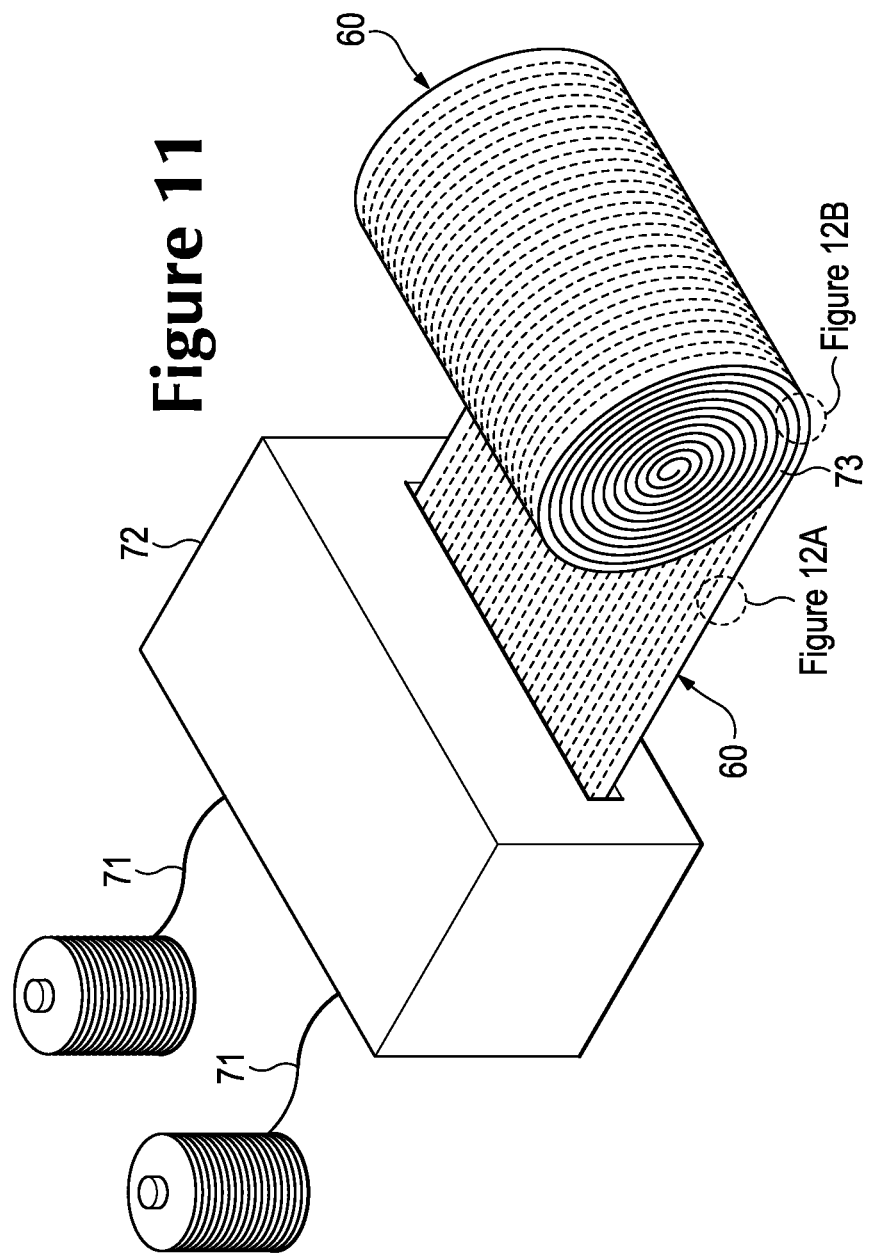
FIG. 11 is a schematic perspective view of a process for manufacturing a spacer textile material that may be utilized in the chamber.

A general process for manufacturing spacer textile material 60 is depicted in FIG. 11. In the process, one or more yarns 71 are fed into a conventional knitting apparatus 72, which mechanically-manipulates yarns 71 to form each of layers 61 and 62 and connecting members 63. As such, layers 61 and 62 may be knitted layers, and connecting members 63 may be sections of at least one yarn that extend between layers 61 and 62. Moreover, the process forms spaces 64, edges 65, and stabilization structures 66. Once formed, spacer textile material 60 exits knitting apparatus 72 and is collected on a roll 73. After a sufficient length of spacer textile material 60 is collected, roll 73 may be shipped or otherwise transported to a manufacturer of chamber 32, otherwise utilized to form tensile member 50 of chamber 32, or used for other purposes. Although not always performed, spacer textile material 60 may be subjected to various finishing operations (e.g., dying, fleecing) prior to being collected on roll 73.

Figure 12A:
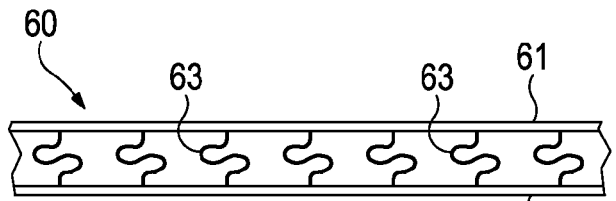
FIGS. 12A and 12B are side elevational views of portions of the spacer textile material, as defined in FIG. 11.
Figure 12B:
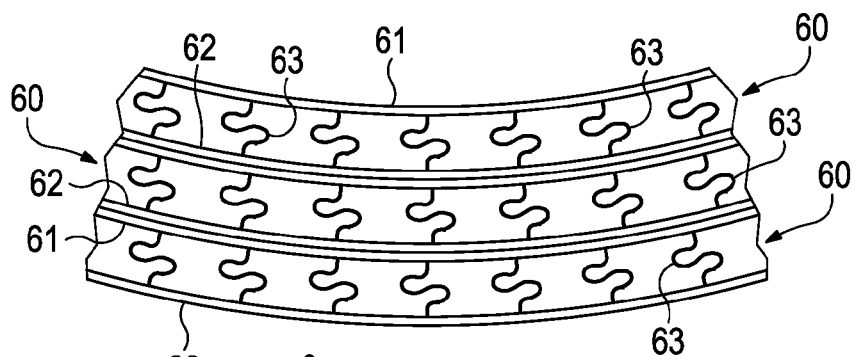

When spacer textile material 60 is formed by knitting apparatus 72, layers 61 and 62 are properly aligned with each other. That is, a point on first layer 61 where a particular connecting member 63 is joined to first layer 61 is aligned with a point on second layer 62 where that particular connecting member 63 is joined to second layer 62, as depicted in FIG. 12A. In other words, layers 61 and 62 are not shifted or misaligned. Although the various connecting members 63 may not be straight and exhibit a wavy or crumpled configuration, the points on layers 61 and 62 are aligned. When spacer textile material 60 is collected onto roll 73, connecting members 63 may bend, crush, or crumple to an even greater degree, but a point on first layer 61 where a particular connecting member 63 is joined to first layer 61 remains aligned with a point on second layer 62 where that particular connecting member 63 is joined to second layer 62, as depicted in FIG. 12B. As such, layers 61 and 62 do not shift or become misaligned with each other as a result of being collected onto roll 73. Additionally, when tensile member 50 is cut or otherwise removed from spacer textile material 60, layers 51 and 52 remain aligned with each other.

Figure 13A:
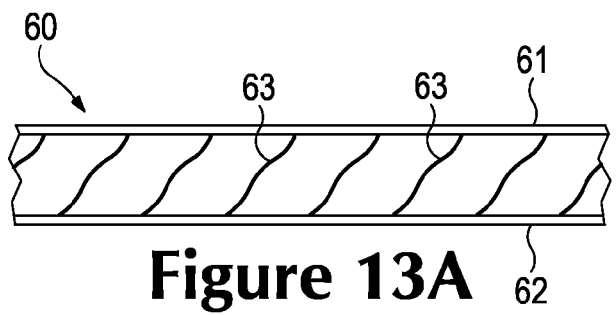
FIGS. 13A and 13B are side elevational views corresponding with FIGS. 12A and 12B and depicting a shifted state of the spacer textile material.
Figure 13B:
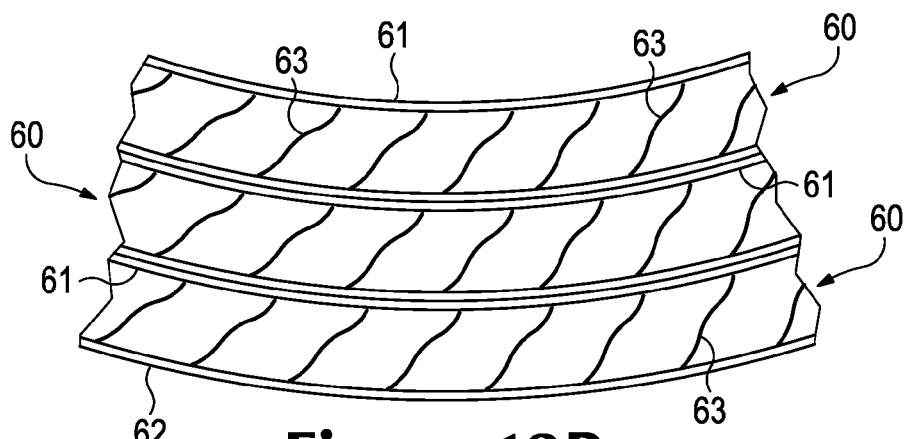

One factor that assists with keeping layers 61 and 62 aligned following the manufacturing of spacer textile material 60 relates to the presence of stabilization structures 66 in spacer textile material 60. In general, stabilization structures 66 hold layers 61 and 62 in proper alignment with each other and resist forces that would otherwise shift layers 61 and 62. More particularly, the density of connecting members 63 in stabilization structures 66 limits the ability of layers 61 and 62 to shift relative to each other. In the absence of stabilization structures 66, layers 61 and 62 may shift in the manner depicted in FIGS. 13A and 13B. More particularly, a point on first layer 61 where a particular connecting member 63 is joined to first layer 61 may be shifted or misaligned with a point on second layer 62 where that particular connecting member 63 is joined to second layer 62 when one or more of stabilization structures 66 are not incorporated into spacer textile material 60. It should also be noted that stabilization structures 66 may retain the alignment of layers 61 and 62 during the various finishing operations noted above. Accordingly, stabilization structures 66 impart the non-shifted configuration of FIGS. 12A and 12B (as well as FIGS. 10A and 10B), rather than allowing layers 61 and 62 to shift, as in the examples of FIGS. 13A and 13B.

An advantage of limiting the degree to which layers 61 and 62 shift relates to the resulting configuration of chamber 32. By retaining the alignment between layers 61 and 62, chamber 32 is formed with more consistency than those chambers with shifted or misaligned spacer textile materials. For example, if layers 51 and 52 of tensile member 50 were to shift, a shape of chamber 32 may be slightly distorted, as in FIG. 17A which will be discussed in more detail below. Moreover, shifting of layers 51 and 52 may increase the difficulty of centrally-locating tensile member 50 relative to each of barrier portions 41-43, which may (a) further distort the shape of chamber 32 and (b) decrease manufacturing efficiency.

Further Configurations

Figure 14A:
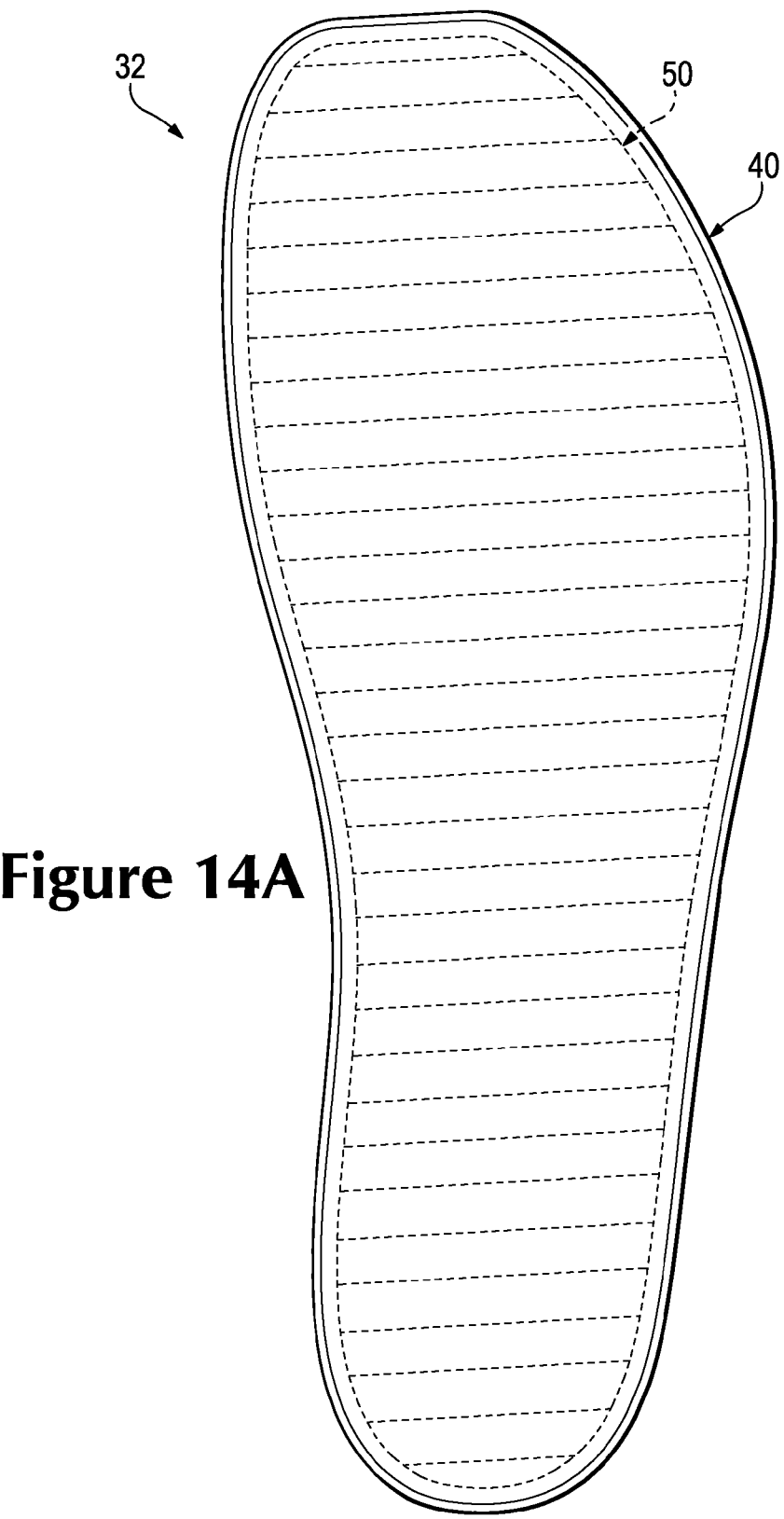
FIGS. 14A-14C are plan views corresponding with FIG. 6 and depicting further configurations of the chamber.
Figure 14B:
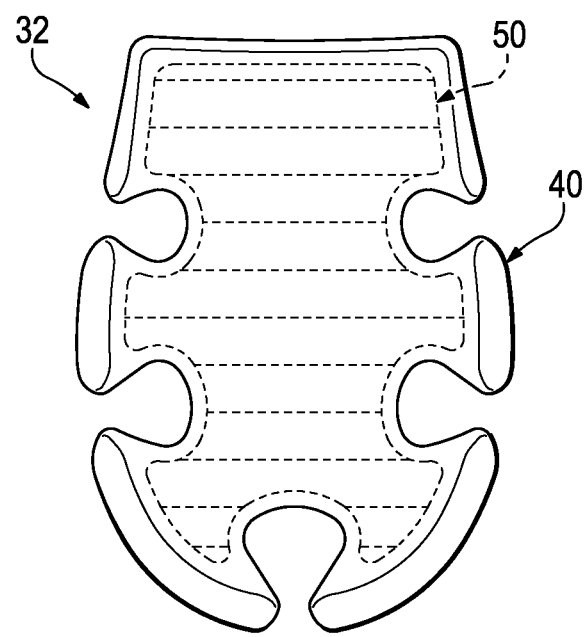
Figure 14C:
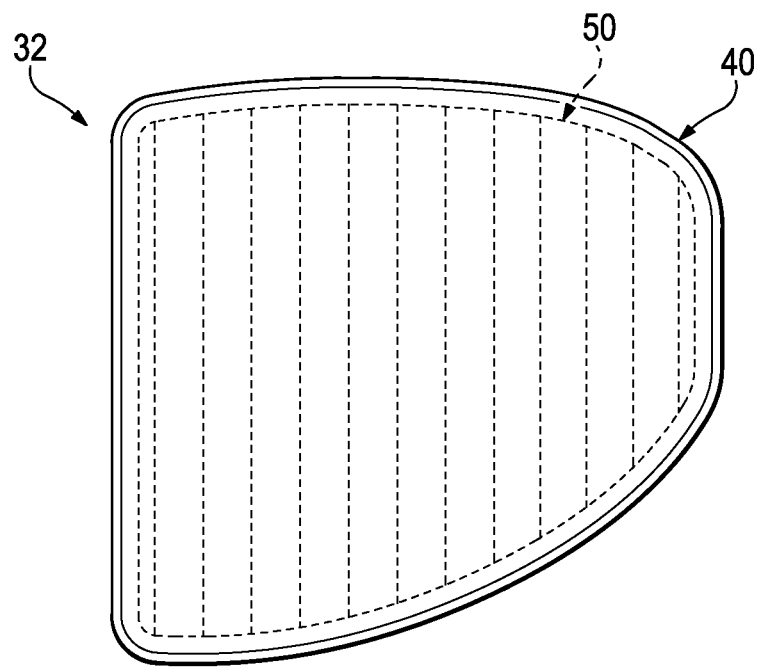

The structures of chamber 32 and spacer textile material 60 discussed above are intended to provide examples of suitable configurations for use in footwear 10. Various other configurations for chamber 32 and spacer textile material 60 may also be utilized. Referring to FIG. 14A, chamber 32 is depicted as having a shape that would extend throughout sole structure 30 and through each of regions 11-13, thereby extending under substantially all of the foot. FIG. 14B depicts chamber 32 as having a lobed configuration, whereas a configuration in FIG. 14C may be suitable for use in forefoot region 11. Accordingly, chamber 32 or other chambers having a similar structure may have various shapes and may be located in various areas of footwear 10.

Further configurations of spacer textile material 60 may also be utilized to impart alignment between layers 61 and 62, while being suitable for use in chamber 32 and a variety of other products. Referring to FIG. 15A, for example, spacer textile material 60 has a greater number of rows formed by connecting members 63, resulting in an increase in the number of spaces 64. Moreover, while row width 68a and stabilization width 68c remain the same, space width 68b is decreased. A reverse configuration is depicted in FIG. 15B, wherein spacer textile material 60 has a lesser number of rows formed by connecting members 63, resulting in a decrease in the number of spaces 64. Moreover, while row width 68a and stabilization width 68c remain the same, space width 68b is increased. In each of the configurations discussed previously, the rows formed by connecting members 63 had a width formed by a single connecting member 63, thereby having a width of a single section of yarn. The rows formed by connecting members 63 may, however, be formed from multiple sections of yarn. For example, a row is formed by two connecting members 63 in FIG. 15C and four connecting members 63 in FIG. 15D.

In each of the configurations discussed previously, stabilization structures 66 are located adjacent to edges 65 and extend along edges 65, thereby being located at a periphery of spacer textile material 60. Referring to FIG. 15E, however, an additional stabilization structure 66 is located in a central area of spacer textile material 60, thereby being centered between edges 65. As another variation, FIG. 15F depicts a space 64 as extending between and separating two stabilization structures 66 adjacent to each of edges 65. As such, two stabilization structures 66 separated by one space 64 are located adjacent to one of edges 65, and two stabilization structures 66 separated by another space 64 are located adjacent to the other of edges 65.

Forming stabilization structures 66 to have a greater concentration or density of connecting members 63 is one method of ensuring that layers 61 and 62 remain aligned following the manufacturing of spacer textile material 60. Referring to FIG. 15G, for example, stabilization structures 66 include joining strands 69 that effectively joins layers 61 and 62. More particularly, joining strands 69 may be stitching that draws layers 61 and 62 together and effectively secures layers 61 and 62 to each other within stabilization structures 66. Stitching or otherwise securing layers 61 and 62 to each other may be utilized, therefore, to supplement the greater concentration or density of connecting members 63 and ensure that layers 61 and 62 remain aligned. Joining strands 69 may be any filament, yarn, or thread formed from nylon, polyester, elastane (i.e., spandex), cotton, or silk, for example. A similar result may be obtained through the use of adhesives, staples, or other structures that may limit movement of layers 61 and 62. Although joining strands 69 may supplement the use of connecting member 63 in stabilization structures 66, joining strands 69 may be used alone as stabilization structures 66, as depicted in FIG. 15H.

Based upon the above discussion, each of chamber 32, spacer textile material 60, and stabilization structures 66 may have various configurations. Although each of these configurations are discussed separately, many of the concepts presented above may be combined to impart specific properties or otherwise ensure that chamber 32, spacer textile material 60, and stabilization structures 66 are optimized for a particular purpose or product. As noted above, stabilization structures 66 retain the proper alignment of layers 61 and 62 in spacer textile material 60. It should be emphasized, however, that forming stabilization structures 66 to have a greater concentration or density of connecting members 63 is one method of ensuring that layers 61 and 62 remain aligned following the manufacturing of spacer textile material 60. Moreover, the use of joining strands 69, adhesives, or staples are also only examples, and other structures or methods may also be employed.

Manufacturing Process

Figure 16A:
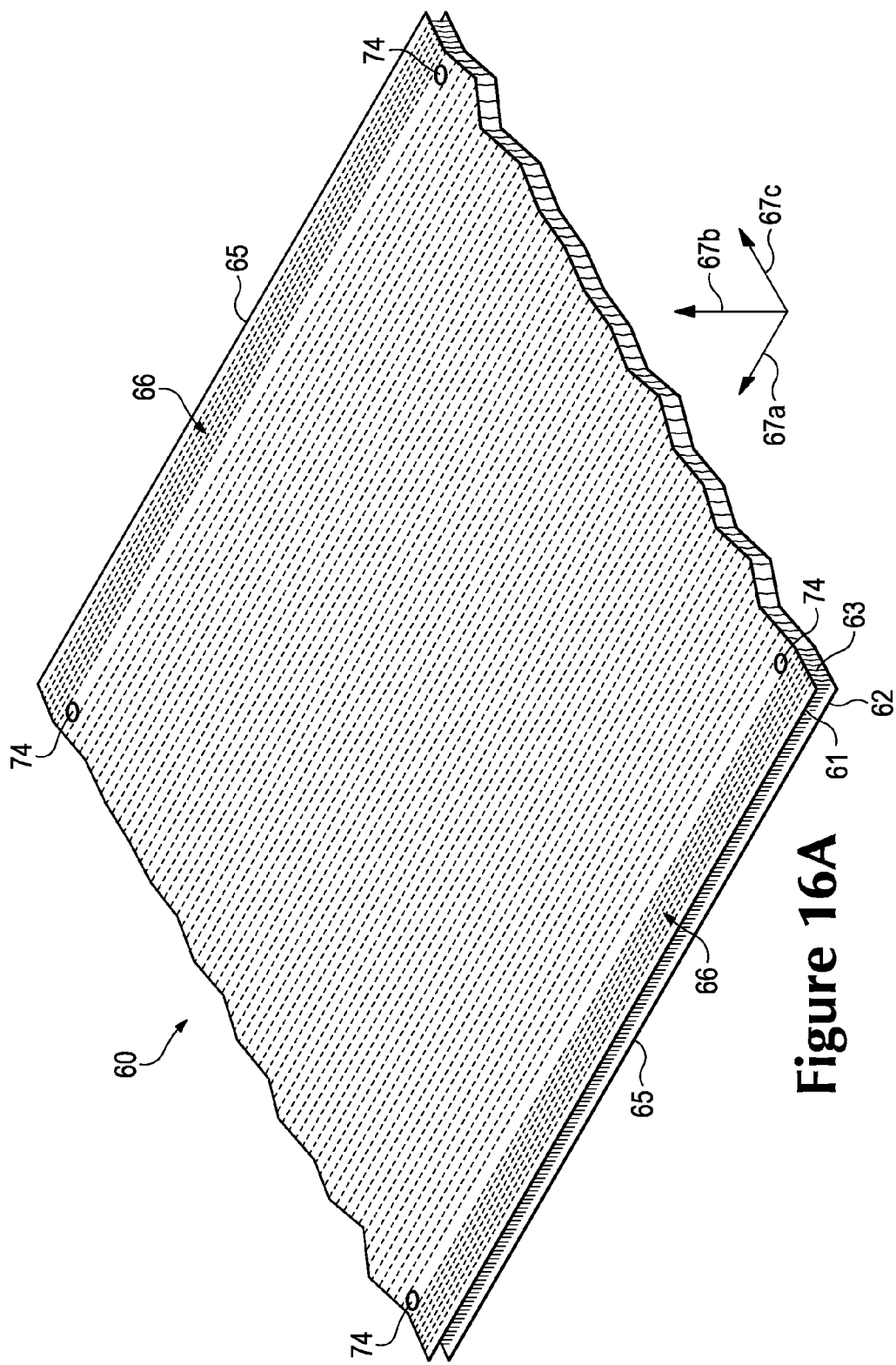
FIGS. 16A-16C are perspective views of a process for removing a tensile member of the chamber from the spacer textile material.
Figure 16B:
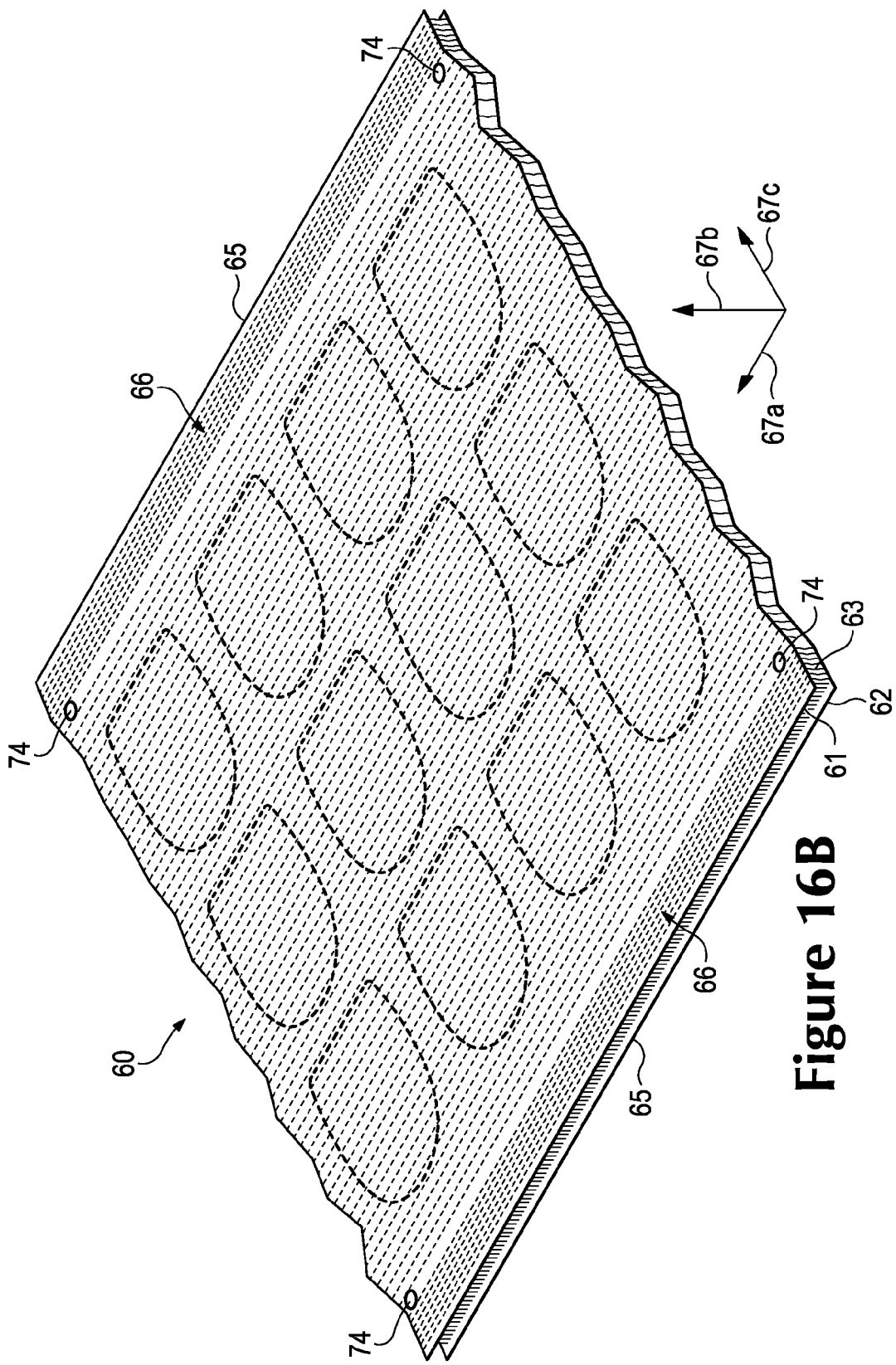
Figure 16C:
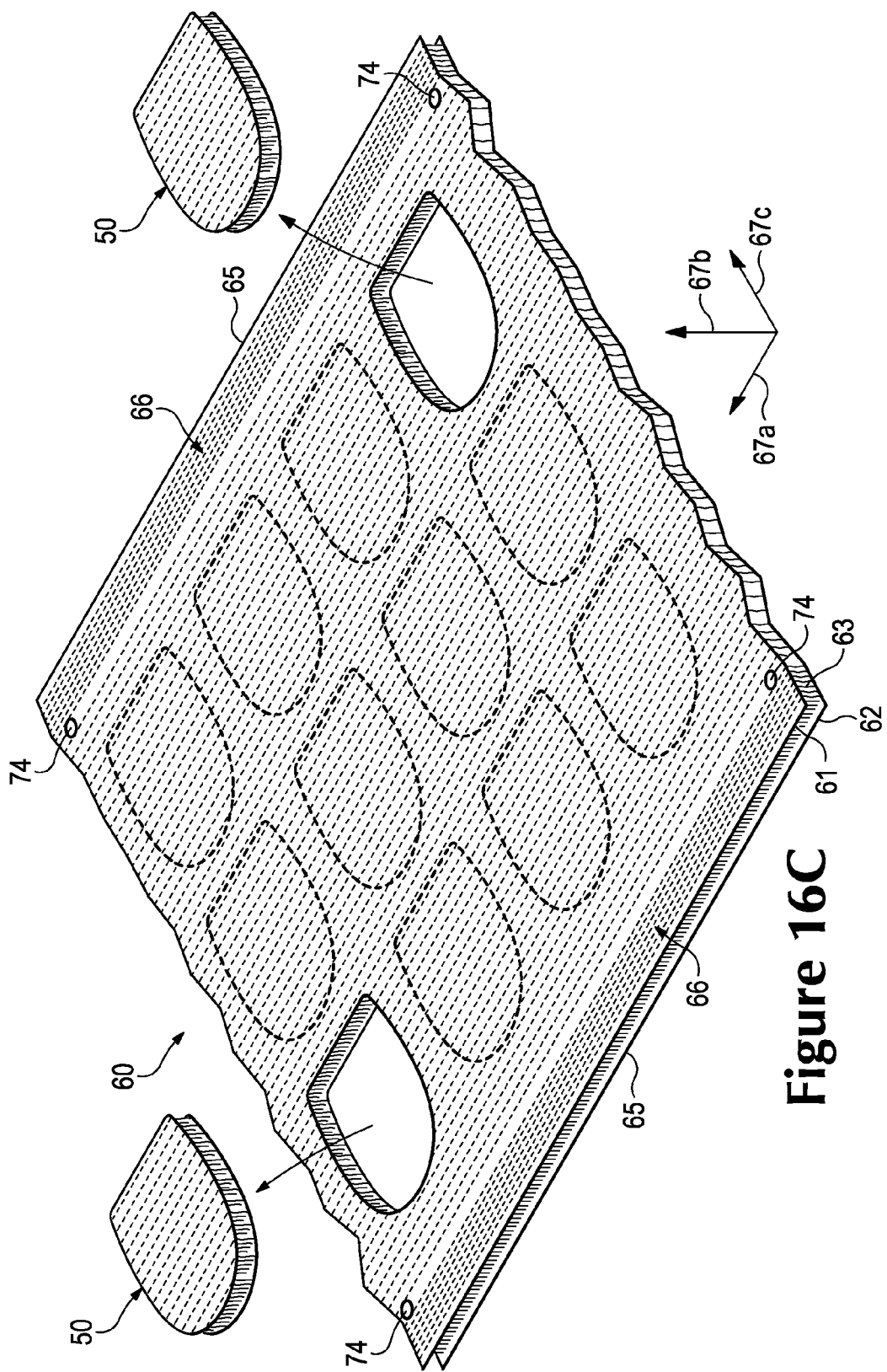

Although a variety of processes may be utilized to form chamber 32, an example of a suitable process will now be discussed. As mentioned above, an element having the shape of tensile member 50 may be cut or otherwise removed from spacer textile material 60 to form tensile member 50. As an initial step, various registration apertures 74 may be formed in an element of spacer textile material 60, as depicted in FIG. 16A. An advantage of registration apertures 74, which will be discussed below, is that portions of spacer textile material 60 where tensile member 50 are intended to be removed may be located with precision. In this example, registration apertures 74 are located within spaces 64 that are adjacent to stabilization structures 66, but other locations may be utilized. For purposes of references, FIG. 16B depicts various dashed outlines representing areas where various tensile members 50 will be removed, based upon the locations of registration apertures 74. Although registration apertures 74 provide a suitable system, other types of registration systems may also be utilized. Following the formation of registration apertures 74, a die-cutting apparatus or other cutting apparatus (e.g., laser cutter, hydrojet cutter) may be utilized to remove various tensile members 50 from spacer textile material 60, as depicted in FIG. 16C.

Tensile member 50 is removed from areas of spacer textile material 60 located between stabilization structures 66. More generally, areas of spacer textile material 60 where stabilization structures 66 are absent are utilized for tensile member 50. In order to form spacer textile material 60 with sufficient area for removing tensile member 50, a series of at least ten rows formed by connecting members 63 are located between two stabilization structures 66. In some configurations, twenty, thirty, fifty, or one-hundred rows may be formed between two stabilization structures 66. In configurations similar to FIG. 15E, where a stabilization structure 66 is spaced inward from edges 65, at least ten rows may be formed between each stabilization structure 66 at edges 65 and the centrally-located stabilization structure 66. In addition to providing sufficient area for removing tensile member 50, an advantage of having a series of at least ten rows between two stabilization structures 66 is to minimize the amount of waste material that may be generated by areas of spacer textile material 60 that form stabilization structures 66. In some configurations, stabilization structures 66 may be separated by a distance of at least ten centimeters to provide sufficient area for removing tensile member 50. When stabilization structures 66 are separated by at least thirty centimeters, waste material may also be minimized.

An advantage of chamber 32 relates to a planar configuration of the opposite surfaces formed by barrier portions 41 and 42. Referring back to FIG. 7B, for example, surfaces formed by barrier portions 41 and 42 are planar in the area of tensile member 50. Notably, surfaces formed by barrier portions 41 and 42 are also planar around the periphery of tensile member 50 (i.e., between edges of tensile member 50 and peripheral bond 45. This feature (i.e., planar surfaces) arises because connecting members 53 are located in close proximity to edges of layers 51 and 52, thereby preventing barrier 40 from expanding or bulging outward in the periphery. It should be noted that this precision in the location of connecting members 53 arises from one or both of (a) the alignment of layers 51 and 52 due to the presence of stabilization structures 66 and (b) the precision in the removal of tensile member 50 from spacer textile material 60 due to registration apertures 74 or another registration system.

For purposes of example, chamber 32 is depicted in FIG. 17A as having a tensile member 50 where layers 51 and 52 are shifted or misaligned. As another example, FIG. 17B depicts a configuration wherein connecting members 53 are spaced inward from edges of layers 51 and 52. In both of these scenarios, barrier 40 forms bulges or outwardly-protruding areas at the periphery of chamber 32. Although not depicted, a combination of (a) layers 51 and 52 being shifted or misaligned and (b) connecting members 53 being spaced inward from edges of layers 51 and 52 may also form bulges or outwardly-protruding areas. Although bulges or outwardly-protruding areas are generally discussed herein as being a negative attribute for chamber 32, these bulges or outwardly-protruding areas may impart advantages to chamber 32. For example, the upwardly and outwardly-protruding area in FIG. 17A may be located within footwear 10 to support an arch of a foot. As another example, the configuration of chamber 32 in FIG. 17B may be located within footwear 10 such that the foot is located between the outwardly-protruding areas, thereby effectively wrapping around lower areas of the foot.

Figure 18:
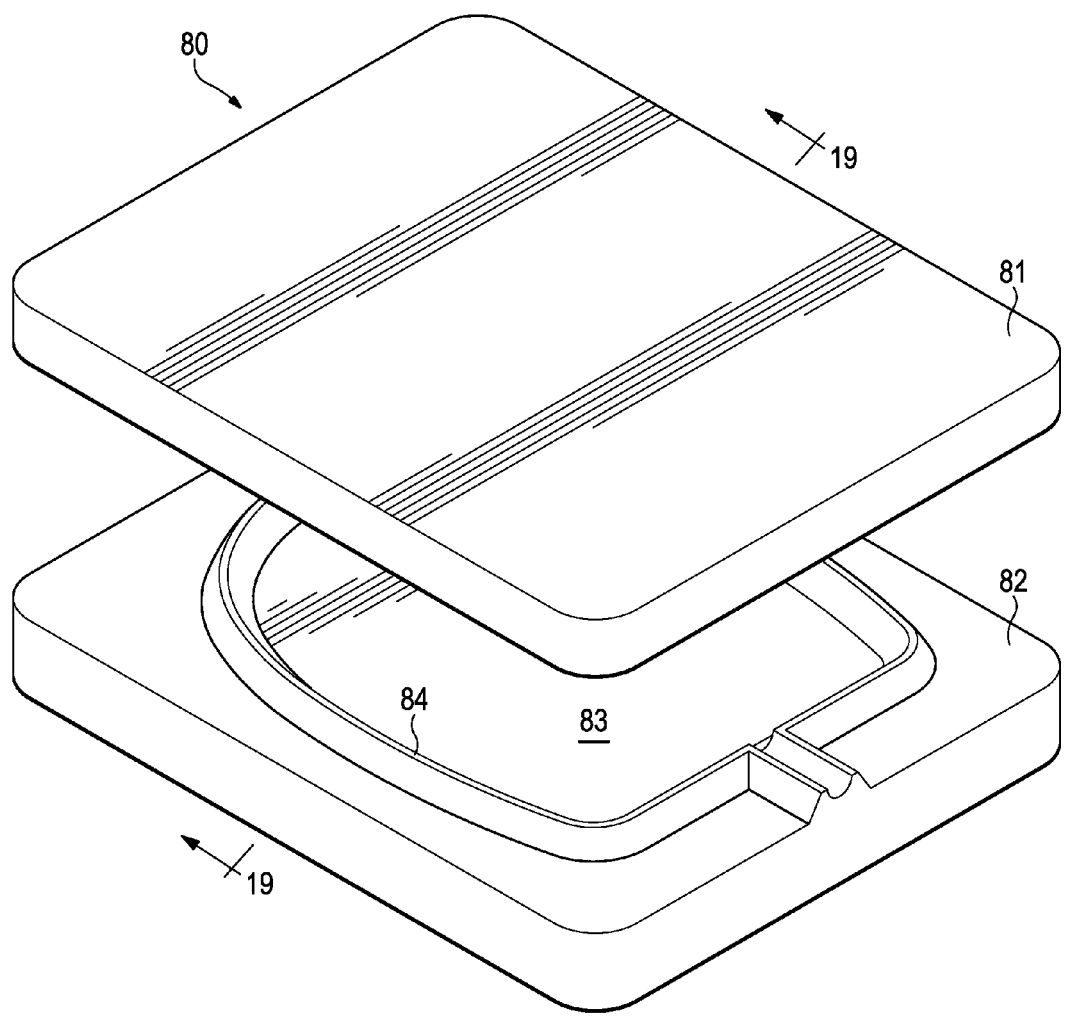
FIG. 18 is a perspective view of a mold for forming the chamber.

A mold 80 that may be utilized in a thermoforming process for forming chamber 32 is depicted in FIG. 18 as including an upper mold portion 81 and a lower mold portion 82. Mold portions 81 and 82 cooperatively define a cavity 83 within mold 80 having a general outline of chamber 32. As discussed below, mold 80 (a) thermoforms or otherwise shapes a pair of polymer layers 47 to form barrier 40, (b) bonds tensile member 50 to polymer layers 47 (i.e., barrier 40), and (c) bonds polymer layers 47 to each other to form peripheral bond 45.

In forming chamber 32, polymer layers 47 are heated to a temperature that facilitates bonding between the components. Depending upon the specific materials utilized for tensile member 50 and polymer layers 47, suitable temperatures may range from 120 to 200 degrees Celsius (248 to 392 degrees Fahrenheit) or more. As an example, a material having alternating layers of thermoplastic polyurethane and ethylene-vinyl alcohol copolymer may be heated to a temperature in a range of 149 to 188 degrees Celsius (300 and 370 degrees Fahrenheit) to facilitate bonding. Various radiant heaters or other devices may be utilized to heat the components of chamber 32 (i.e., polymer layers 47 and tensile member 50). In some manufacturing processes, mold 80 may be heated such that contact between mold 80 and the components of chamber 32 raises the temperature of the components to a level that facilitates bonding.

Figure 19A:
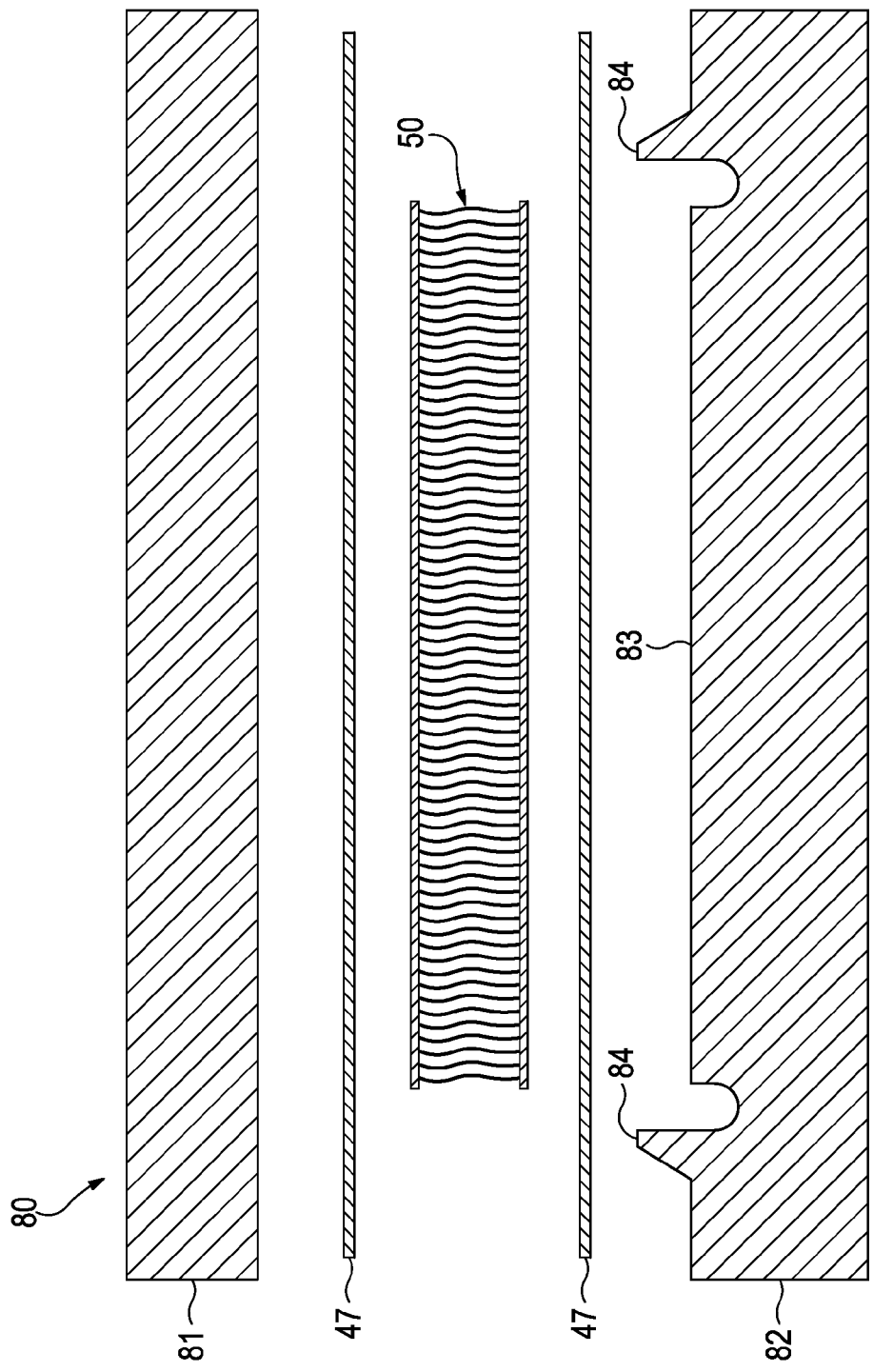
FIGS. 19A-19C are schematic cross-sectional views of a process for forming the chamber, as defined by section line 19 in FIG. 18.
Figure 19B:
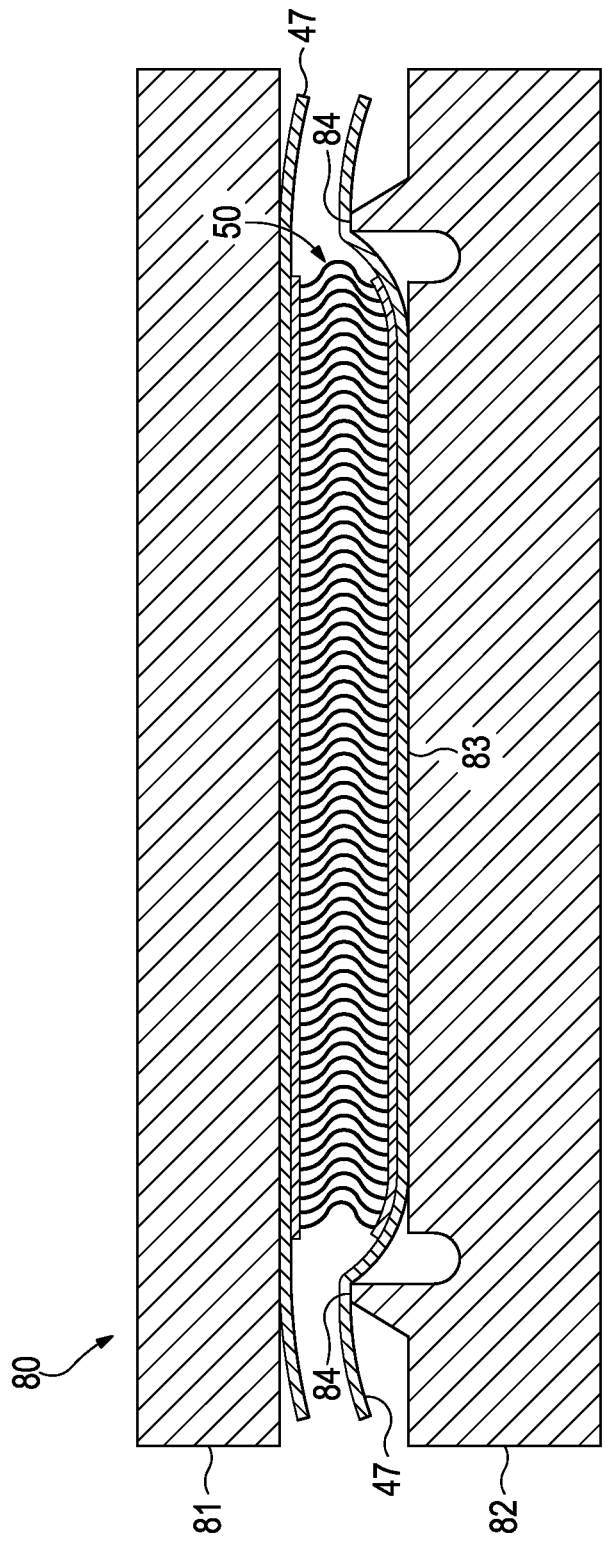

Following heating, the components of chamber 32 are located between mold portions 81 and 82, as depicted in FIG. 19A. In order to properly position the components, a shuttle frame or other device may be utilized. Once positioned, mold portions 81 and 82 translate toward each other and begin to close upon the components such that (a) a ridge 84 in lower mold portion 82 approaches a lower surface of upper mold portion 81 (b) polymer layers 47 contact tensile member 50 so as to extend into cavity 83, as depicted in FIG. 19B. Accordingly, the components are located relative to mold 80 and initial shaping and positioning has occurred.

At the stage depicted in FIG. 19B, air may be partially evacuated from the area around polymer layers 47 through various vacuum ports in mold portions 81 and 82. The purpose of evacuating the air is to draw polymer layers 47 into contact with the various contours of mold 80. This ensures that polymer layers 47 are properly shaped in accordance with the contours of mold 80. Note that polymer layers 47 may stretch in order to extend around tensile member 50 and into mold 80. In comparison with the thickness of barrier 40 in chamber 32, polymer layers 47 may exhibit greater thickness prior to molding. This difference between the original thicknesses of polymer layers 47 and the resulting thickness of barrier 40 may occur as a result of the stretching that occurs during this stage of the thermoforming process.

In order to provide a second means for drawing polymer layers 47 into contact with the various contours of mold 80, the area between polymer layers 47 and proximal tensile member 50 may be pressurized. During a preparatory stage of this method, an injection needle may be located between polymer layers 47, and the injection needle may be located such that ridge 84 envelops the injection needle when mold 80 closes. A gas may then be ejected from the injection needle such that polymer layers 47 engage ridge 84, thereby forming an inflation conduit 48 (see FIG. 20) between polymer layers 47. The gas may then pass through inflation conduit 48, thereby entering and pressurizing the area proximal to tensile member 50. In combination with the vacuum, the internal pressure ensures that polymer layers 47 contact the various surfaces of mold 80.

Figure 19C:
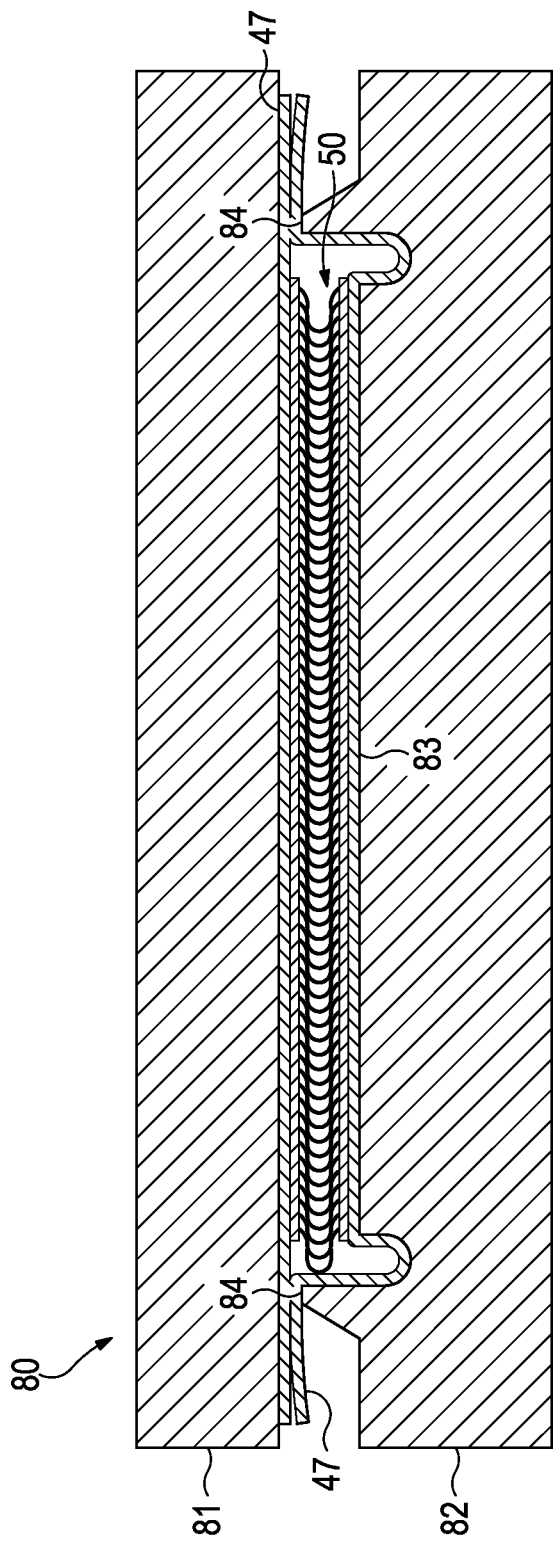

As mold 80 closes further, as depicted in FIG. 19C, ridge 84 bonds polymer layers 47 to each other, thereby forming peripheral bond 45. As discussed above, a supplemental layer or thermoplastic threads may be incorporated into layers 51 and 52 of tensile member 50 in order to facilitate bonding between tensile member 50 and barrier 40. The pressure exerted upon the components by mold 80 ensures that the supplemental layer or thermoplastic threads form a bond between tensile member 50 and polymer layers 47. Furthermore, portions of ridge 84 that extend away from cavity 83 form a bond between other areas of polymer layers 47 to form inflation conduit 48.

Figure 20:
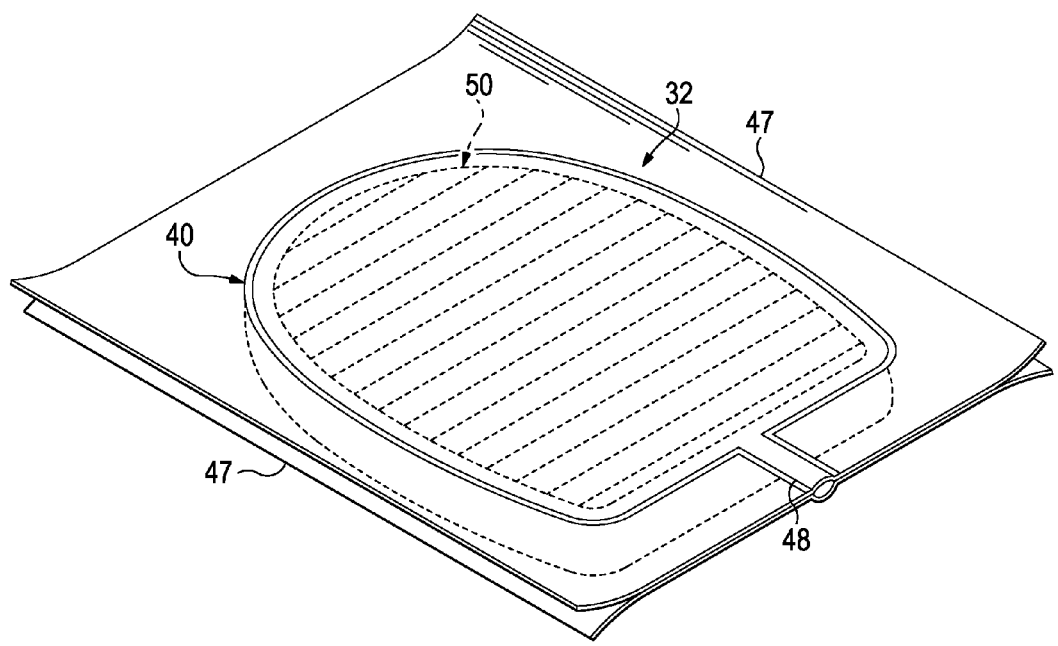
FIG. 20 is a perspective view of the chamber and residual portions of polymer sheets following the process for forming the chamber.

When bonding is complete, mold 80 is opened and chamber 32 and excess portions of polymer layers 47 are removed and permitted to cool, resulting in the configuration depicted in FIG. 20. A fluid may be injected into chamber 32 through the inflation needle and inflation conduit 48. In addition, a sealing process is utilized to seal inflation conduit 48 adjacent to chamber 32 after pressurization, thereby forming inlet 46. The excess portions of polymer layers 47 are then removed, thereby completing the manufacture of chamber 32. As an alternative, the order of inflation and removal of excess material may be reversed. As a final step in the process, chamber 32 may be tested and then incorporated into midsole 31 of footwear 10.

As discussed above, an advantage of chamber 32 relates to a planar configuration of the opposite surfaces formed by barrier portions 41 and 42. During the process discussed above, tensile member 50 is removed from a larger element of spacer textile material 60, which includes stabilization structures 66. Although tensile member 50 is separated from portions of spacer textile material 60 that included stabilization structures 66, layers 51 and 52 remain properly aligned throughout the process of forming chamber 32. Moreover, this advantageous configuration of chamber 32 arises from one or both of (a) the alignment of layers 51 and 52 due to the presence of stabilization structures 66 and (b) the precision in the removal of tensile member 50 from spacer textile material 60 due to registration apertures 74 or another registration system.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method for manufacturing a fluid-filled chamber, the method comprising:
   obtaining a spacer textile material having a first layer, a second layer, and a plurality of connecting members extending between and joining the first layer and the second layer, the connecting members forming a series of at least ten rows that are separated by spaces, the rows having a width that is less than a width of the spaces, and the connecting members forming at least one stabilizing row with a width that is greater than the width of the spaces;
   removing a tensile member from an area of the spacer textile material where the stabilizing row is absent;
   locating the tensile member between a first polymer element and a second polymer element; and
   bonding (a) the first layer to the first polymer element, (b) the second layer to the second polymer element, and (c) the first polymer element and the second polymer element together around a periphery of the tensile member.

2. The method recited in claim 1, further including a step of utilizing a registration system to locate the rows in the tensile member relative to an edge of the tensile member.

3. The method recited in claim 2, wherein the step of utilizing the registration system includes forming apertures in the spacer textile material.

4. The method recited in claim 1, further including a step of forming apertures in the spacer textile material prior to the step of removing the tensile member.

5. The method recited in claim 1, further including a step of pressurizing an interior void within the chamber.

6. The method recited in claim 1, further including a step of incorporating the chamber into an article of footwear.

7. The method recited in claim 1, further including a step of securing bonding layers to each of the first layer and the second layer, and the step of bonding including joining the bonding layers to the first polymer element and the second polymer element to bond (a) the first layer to the first polymer element, (b) the second layer to the second polymer element.

8. A method for manufacturing a fluid-filled chamber, the method comprising:
   obtaining a spacer textile material having a first layer, a second layer, and a plurality of connecting members extending between and joining the first layer and the second layer, the connecting members forming a plurality of rows separated by spaces, the rows including a first row, at least ten second rows, and a third row, the ten second rows being located in an area between the first row and the third row, and a width of the first row and a width of the third row being at least five times a width of each of the ten second rows;
   removing a tensile member from the area between the first row and the third row;
   locating the tensile member between a first polymer element and a second polymer element; and
   bonding (a) the first layer to the first polymer element, (b) the second layer to the second polymer element, and (c) the first polymer element and the second polymer element together around a periphery of the tensile member.

9. The method recited in claim 8, further including a step of utilizing a registration system to locate the rows in the tensile member relative to an edge of the tensile member.

10. The method recited in claim 9, wherein the step of utilizing the registration system includes forming apertures in the spacer textile material.

11. The method recited in claim 8, further including a step of forming apertures in the spacer textile material prior to the step of removing the tensile member.

12. The method recited in claim 8, further including a step of pressurizing an interior void within the chamber.

13. The method recited in claim 8, further including a step of incorporating the chamber into an article of footwear.

14. The method recited in claim 8, further including a step of securing bonding layers to each of the first layer and the second layer, and the step of bonding including joining the bonding layers to the first polymer element and the second polymer element to bond (a) the first layer to the first polymer element, (b) the second layer to the second polymer element.

15. A method for manufacturing a fluid-filled chamber, the method comprising:
   obtaining a spacer textile material having a first layer, a second layer, and a plurality of connecting members extending between and joining the first layer and the second layer, the connecting members forming a plurality of rows separated by spaces, and the spacer textile material including a stabilization structure that aligns the first layer with the second layer;
   removing a tensile member from an area of the spacer textile material where the stabilization structure is absent;
   locating the tensile member between a first polymer element and a second polymer element; and
   bonding (a) the first layer to the first polymer element, (b) the second layer to the second polymer element, and (c) the first polymer element and the second polymer element together around a periphery of the tensile member.

16. The method recited in claim 15, wherein the step of obtaining the spacer textile material includes selecting the stabilization structure to be one of (a) a material with a different shrinkage rate than a material of the connecting members, (b) a thread that ties the first layer to the second layer, and (c) stabilizing members extending between and joining the first layer and the second layer, the stabilizing members being located within at least one of the spaces.

17. The method recited in claim 15, further including a step of utilizing a registration system to locate the connecting members relative to an edge of the tensile member.

18. The method recited in claim 15, further including a step of pressurizing an interior void within the chamber.

19. The method recited in claim 15, further including a step of incorporating the chamber into an article of footwear.

20. The method recited in claim 15, further including a step of securing bonding layers to each of the first layer and the second layer, and the step of bonding including joining the bonding layers to the first polymer element and the second polymer element to bond (a) the first layer to the first polymer element, (b) the second layer to the second polymer element.

\* \* \* \* \*